(12) United States Patent
Godschalx et al.

(10) Patent No.: US 6,288,188 B1
(45) Date of Patent: *Sep. 11, 2001

(54) POLYPHENYLENE OLIGOMERS AND POLYMERS

(75) Inventors: James P. Godschalx; Duane R. Romer; Zenon Lysenko; Michael E. Mills, all of Midland, MI (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,838

(22) Filed: Mar. 31, 1999

Related U.S. Application Data

(63) Continuation of application No. 08/834,677, filed on Apr. 1, 1997, now Pat. No. 5,965,679, which is a continuation-in-part of application No. 08/711,838, filed on Sep. 10, 1996, now abandoned.

(51) Int. Cl.[7] .................................................. C08F 38/00
(52) U.S. Cl. ......................... 526/285; 526/316; 528/220
(58) Field of Search .................................. 526/281, 283, 526/285, 316; 528/396, 220

(56) References Cited

U.S. PATENT DOCUMENTS

| | | | |
|---|---|---|---|
| 4,011,378 | 3/1977 | White | 526/13 |
| 4,093,790 | 6/1978 | Bracke | 526/144 |
| 4,339,526 | 7/1982 | Baise et al. | 430/296 |
| 4,380,619 | 4/1983 | Reinhardt et al. | 526/259 |
| 4,400,540 | 8/1983 | Reinhardt et al. | 568/31 |
| 5,169,929 | 12/1992 | Tour et al. | 528/397 |
| 5,227,457 | 7/1993 | Marrocco, III et al. | 528/183 |
| 5,236,686 | 8/1993 | Tour et al. | 423/445 |
| 5,334,668 | 8/1994 | Tour et al. | 525/416 |
| 5,338,823 | 8/1994 | Tour et al. | 528/397 |

FOREIGN PATENT DOCUMENTS 52013528   2/1997   (JP) .

OTHER PUBLICATIONS

Dilthey et al., "On Tetraphenylcyclopentadienone and its Reduction Products, " J. Prakt. Chem., vol. 139, pp. 1–16 (1933).
Havens et al. "Improved syntheses of Benzils as Polymer Intermediates,"Journal of Polymer Science, Polymer Chemistry Edition, vol. 19, pp. 1349–1356 (1981).
Hyatt, "Synthesis of a Hexaalkynylhexaphenylbenzene, "Org. Prep. Proced. Int., vol. 23, No. 4, pp. 460–463 (1991).
Jones et al. "Synthesis and characterization of multiple phenylethynybenzenes via cross–coupling with activated palladium catalyst, " Polymer, vol. 36, No. 1, pp. 187–192 (1995).
Kumar et al., "Diels–Alder Polymerization between Bis(cyclopentadienones) and Acetylenes. A Versatile Route to New Highly Aromatic Polymers," Macromolecules, vol. 28, pp. 124–130 (1995).
Kumar et al., "Hybrid Polyimide–Polyphenylenes by the Diels–Alder Polymerization Between Biscyclopentadienones and Ethynyl–Terminated Imides, " Acs Symp. Ser. vol. 614, pp. 518–526 (1995).
Kumar et al., "The Diels–Alder Polymerization of Biscyclopentadienones and Ethynyl Terminated Imides," Polymeric Materials Science and Engineering, vol. 72, pp. 444–445 (1995).
Morgenroth et al. "Polyphenylene Dendrimers: From Three–Dimensional Structures," Angew. Chem. Int. Ed. Engl., vol. 36, No. 6, pp. 631–634 (1997).
Mukamal et al., "Diels–Alder Polymerizations: Polymers Containing Controlled Aromatic Segments," Polym. Prepr., vol. 8, pp. 496–500 (1967).
Mukamal et al., "Diels–Alder Polymers. III. Polymers Containing Phenylated Phenylene Units, " Journal of Polymer Science, vol. 5, pp. 2721–2729 (1967).
Ogliaruso et al., "Bistetracyclones" and "Bishexaphenylbenzenes," J. Org. Chem., vol. 28, pp. 2725–2728 (1963).
Ogliaruso et al., "Bistetracyclones and Bishexaphenylbenzenes," J. Org. Chem., vol. 30, pp. 3354–3360 (1965).
Ogliaruso et al., "Chemistry of Cyclopentadienones," Chemical Reviews, vol. 65, pp. 261–367 (1965).
Reinhardt et al., "Pendant Oxy and Thioarylene Aromatic Heterocyclic Polymers, " Polym. Prepr., vol. 23, pp. 119–120 (1982).
Reinhardt et al., "Phenylated Aromatic Heterocyclic Polyphenylenes Containing Pendant Diphenylether and Diphenylsulfide Groups, " Polym. Sci. Technol., vol. 25, pp. 41–53 (1984).
Sastri et al., "Cure kinetics of a multisubstituted acetylenic monomer, " Polymer, vol. 36, No. 7, pp. 1449–1454 (1995).
Stille, "Aromatic Polymers: Single–and Double–Stranded Chains, " J. Macromol. Sci.–Chem., vol. 3, pp. 1043–1065 (1969).

(List continued on next page.)

*Primary Examiner*—Jeffrey Mullis

(57) ABSTRACT

An oligomer, uncured polymer or cured polymer comprising the reaction product of one or more polyfunctional compounds containing two or more cyclopentadienone groups and at least one polyfunctional compound containing two or more aromatic acetylene groups wherein at least some of the polyfunctional compounds contain three or more reactive groups. Such oligomers and uncured polymers may be cured to form cured polymers which are useful as dielectrics in the microelectronics industry, especially for dielectrics in integrated circuits.

3 Claims, No Drawings

OTHER PUBLICATIONS

Stille et al., "Cantenation and Kinetics of the Diels–Alder Step–Growth Reaction in the Synthesis of Phenylated Polyphenylenes," Macromolecules, vol. 5, pp. 49–55 (1972).

Stille et al., "Diels–Alder Polymerizations: Polymers Containing Controlled Aromatic Segments," J. Polym. Sci., vol. 4, pp. 791–793 (1966).

Stille et al., "Diels–Alder Polymerizations. IV. Polymers Containing Short Phenylene Blocks Connected by Alkylene Units," Macromolecules, vol. 1, pp. 431–436 (1968).

Tour, "Soluble Oligo–and Ployphenylenes," Advanced Materials, vol. 6, No. 3, pp. 190–198 (1994).

Wrasidlo et al., "Preparation of Poly(Octaphenyl–Tetraphenylene)," J. Polym. Sci., vol. 7, pp. 519–523 (1969).

Eisenberg et al., *Aromatic Ionomer Membranes: Synthesis, Structure and Properties*, Contemp. Top. Polym. Sci., vol. 5, pp. 375–400 (1984).

Mehta et al., *Synthesis and Characterization of Polymides Prepared via Diels–Alder Polymerization of a Bistetraphenylcyclopentadienone and Various Bisacetylenes*, Polym. Prepr. (Am. Chem. Soc., Div. Polym. Chem.), vol. 36(1), pp. 505–506 (1995) —Chemical Abstract.

Harris et al., *Phenylated Polymides—{poly[oxy–6–2(1,3–dioxo–4,5,7–triphenylisoindolinediyl)–1,4–phenyleneoxy–1,4–phenylene–2,6–(1,3–dioxo–4,5,7–triphenylisoindolinediyl)–1,4–phenylene]}*, Macromol. Synth., vol. 8, pp. 75–78 (1982)—Chemical Abstract.

Dineen et al., *Synthesis of Diels–Alder Polymers via Benzyne Intermdiates*, Polym Prepr., Am. Chem. Soc., Div. Polym. Chem., vol. 19(2), pp 34–9 (1978)—Chemical Abstract.

Harvey et al., *Synthesis and Electronic Spectra of Substituted Bis(hexaphenylbenzenes)*, J. Chem. Eng. Data, vol. 22(1), pp. 110–113 (1977)—Chemical Abstract.

Harvey et al., *Synthesis, Electronic Spectra, and Thermal Behavior of Bis(heptaphenylcycloheptatrienes)*, J. Org. Chem., vol. 41(21), pp 3374–3377 (1976)—Chemical Abstract.

Stille et al., *The Crosslinking of Thermally Stable Aromatic Polymers by Aryl Cyanate Cyclotrimerization*, Macromolecules, vol. 9(3), pp. 516–523 (1976)—Chemical Abstract.

Harris et al., *Soluble Aromatic Polyimides. The Polymerization of Phenylated Bis(phthalic anhydrides) with Diamines*, Appl. Polym. Symp., vol. 26 (Polym. Polcondensat), pp. 421–428 (1975)—Chemical Abstract.

Harris et al., *Soluble Aromatic Polyimides from Phenylated Dianhydrides*, J. Polym Sci., Polym. Lett. Ed., vol. 13(5), pp. 283–285 (1975)—Chemical Abstract.

Stille et al., *Catenation and Kinetics of the Diess–Alder Step–growth Reaction in the Synthesis of Phenylated Polyphenylenes*, Macromolecules, vol. 5(1), pp. 49–55 (1972)—Chemical Abstract.

POLYPHENYLENE OLIGOMERS AND POLYMERS

CROSS REFERENCE TO RELATED APPLICATIONS

This Application is a continuation of prior application Ser. No. 08/834,677, filed Apr. 1, 1997, now U.S. Pat. No. 5,965,679, which is a continuation-in-part of application Ser. No. 08/711,838; filed Sep. 10, 1996, now abandoned which is incorporated herein by reference.

BACKGROUND OF THE INVENTION

This invention relates to polyphenylene oligomers and polymers and processes for preparing and using the same. Such oligomers and polymers may be useful as dielectric resins in microelectronics fabrication.

Polymer dielectrics may be used as insulating layers between various circuits and layers within circuits in microelectronic devices such as integrated circuits, multichip modules, laminated circuit boards and the like. The microelectronics fabrication industry is moving toward smaller geometries in its devices to enable lower power and faster speeds. As the conductor lines become finer and more closely packed, the requirements of the dielectrics between such conductors become more stringent.

While polymer dielectrics often provide lower dielectric constants than inorganic dielectrics such as silicon dioxide, they often present challenges to process integration during fabrication. For example, to replace silicon dioxide as a dielectric in integrated circuits, the dielectric must be able to withstand processing temperatures during metallization and annealing steps of the process. Preferably, the dielectric material should have a glass transition temperature greater than the processing temperature. The dielectric must also retain the desirable properties under device use conditions. For example, the dielectric should not absorb water which may cause an increase in the dielectric constant and potential corrosion of metal conductors.

For some integration schemes, the oligomer should preferably planarize and gap fill a patterned surface when applied by conventional application techniques such as spin coating.

Currently, polyimide resins are one class of materials which are employed as thin film dielectrics in the electronics industry. However, polyimide resins may absorb water and hydrolyze which can lead to circuit corrosion. Metal ions may migrate into the dielectric polyimide layer requiring a barrier layer between the metal lines and polyimide dielectric. Polyimides may exhibit poor planarization and gap fill properties. Non-fluorinated polyimides may exhibit undesirably high dielectric constants.

Kumar and Neenan, in *Macromolecules*, 1995, 28, pp 124–130, disclose numerous polyphenylenes made from biscyclopentadienones and bisacetylenes. They teach that the polyphenylenes have potential as photodefineable organic dielectrics. Wrasidlo and Augl, in *J. Polym. Sci.*, Part B (1969), 7(7), 519–523, disclose the copolymerization of 1,4-bis(phenylethynyl)benzene with 3,3'-(1,4-phenylene)-bis(2,4,5-triphenylpentadienone). They report a soluble, yellow, infusible polymer was obtained.

The materials described in Kumar and Wrasidlo are soluble but may not be suitable for some uses such as spin coating to fill gaps because the materials were polymerized to exhaustion of the cyclopentadienone moieties which provides relatively high molecular weights. The molecular weight may be too high to permit application by spin coating over a patterned surface containing gaps to be filled by the dielectric. Based on the reported glass transition temperatures, such materials may not be able to withstand the processing desired for interlayer dielectrics in integrated circuits.

In U.S. Pat. Nos. 5,334,668; 5,236,686; 5,169,929; and 5,338,823, Tour describes several methods of preparing cross-linkable polyphenylene compositions for the preparation of glassy carbon. The polyphenylenes are made by polymerizing 1-bromo-4-lithiobenzene to form a brominated polyphenylene and then coupling substituted phenylacetylenes, such as phenylacetylenyl phenyl acetylene, to the residual bromines. The polyphenylenes have melting points around 200° C. prior to crosslinking.

It would be desirable to provide a polymer dielectric to the microelectronics fabrication industry which provides a reliably low dielectric constant, high thermal stability and a high glass transition temperature and which preferably, permits application by spin coating to planarize and fill gaps on a patterned surface.

SUMMARY OF INVENTION

In a first aspect, the present invention is an oligomer, uncured polymer or cured polymer comprising the reaction product of one or more polyfunctional compounds containing two or more cyclopentadienone groups and at least one polyfunctional compound containing two or more aromatic acetylene groups wherein at least some of the polyfunctional compounds contain three or more reactive groups.

A reactive group, as used herein, is defined as a cyclopentadienone or acetylene group. An oligomer, as used herein, is defined as a reaction product of two or more monomer units of the invention which will gap fill, that is, fill a rectangular trench which is one micrometer deep and one half micrometer across without leaving a void when cured. An uncured polymer, as used herein, is defined as a reaction product of monomers of the invention which no longer gap fills but which contains significant unreacted cyclopentadienone or acetylene functionality. A cured polymer, as used herein, is defined as a reaction product of monomers of the invention which contains no significant unreacted cyclopentadienone or acetylene functionality. Significant unreacted cyclopentadienone or acetylene functionality requires that said moieties be reactive to further advance the polymerization.

A feature of the invention is that it comprises the reaction product of one or more polyfunctional compounds containing two or more cyclopentadienone groups and at least one polyfunctional compound containing two or more aromatic acetylene groups wherein at least some of the polyfunctional compounds contain three or more reactive groups. An advantage of such a reaction product is that it may gap fill and planarize patterned surfaces, and as cured have high thermal stability, a high glass transition temperature and a low dielectric constant.

In a second, preferred aspect, the present invention is an oligomer, uncured polymer or cured polymer comprising the reaction product of one or more polyfunctional compounds containing two or more cyclopentadienone groups and one or more polyfunctional compounds containing two or more aromatic acetylene groups, wherein at least some of the polyfunctional compounds containing aromatic acetylene groups contain three or more acetylene groups.

A feature of the second aspect of the invention is that it comprises the reaction product of at least one or more polyfunctional compounds containing two or more cyclopentadienone groups and at least one polyfunctional compound containing two or more aromatic acetylene groups, wherein at least some of the polyfunctional compounds containing aromatic acetylene groups contain three or more acetylene groups. An advantage of such a reaction product is that it may gap fill and planarize patterned surfaces, and as cured have high thermal stability, a high glass transition temperature and a low dielectric constant.

High thermal stability, a high glass transition temperature, a low dielectric constant and the ability to gap fill and planarize patterned surfaces make the compositions of the invention suitable as polymer dielectrics in microelectronics fabrication. In particular, the combination of low dielectric constant, high thermal stability and high glass transition temperature permit the use of the compositions of the invention as interlayer dielectrics in integrated circuits.

DETAILED DESCRIPTION OF THE INVENTION

Preferably, the oligomers and polymers and corresponding starting monomers of the present invention are:

I. Oligomers and Polymers of the General Formula:

wherein A has the structure:

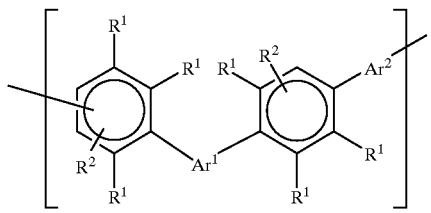

and B has the structure:

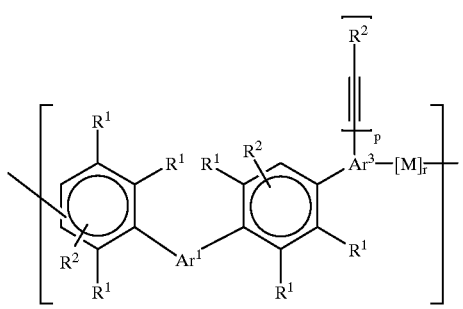

wherein EG are end groups having one or more of the structures:

EG=

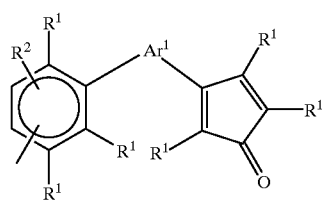

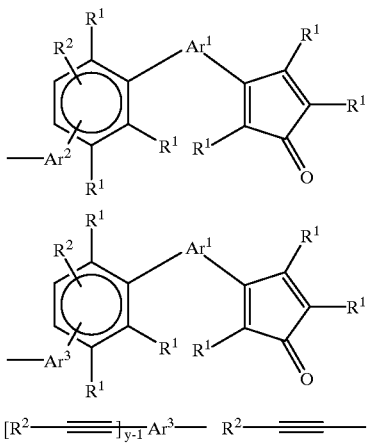

wherein $R^1$ and $R^2$ are independently H or an unsubstituted or inertly-substituted aromatic moiety and $Ar^1$, $Ar^2$ and $Ar^3$ are independently an unsubstituted aromatic moiety or inertly-substituted aromatic moiety, M is a bond, and y is an integer of three or more, p is the number of unreacted acetylene groups in the given mer unit, r is one less than the number of reacted acetylene groups in the given mer unit and p+r=y−1, z is an integer from 0 to about 1000; w is an integer from 0 to about 1000 and v is an integer of two or more.

Such oligomers and polymers can be prepared by reacting a biscyclopentadienone, an aromatic acetylene containing three or more acetylene moieties and, optionally, a polyfunctional compound containing two aromatic acetylene moieties. Such a reaction may be represented by the reaction of compounds of the formulas (a) a biscyclopentadienone of the formula:

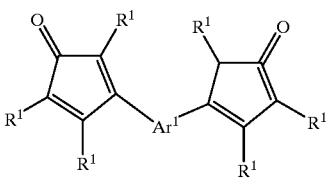

(b) a polyfunctional acetylene of the formula:

[R²———≡———]ᵧ—Ar³

(c) and, optionally, a diacetylene of the formula:

R²═══Ar²═══R² wherein $R^1$, $R^2$, $Ar^1$, $Ar^2$, $Ar^3$ and y are as previously defined.

The definition of aromatic moiety includes phenyl, polyaromatic and fused aromatic moieties. Inertly-substituted means the substituent groups are essentially inert to the cyclopentadienone and acetylene polymerization reactions and do not readily react under the conditions of use of the cured polymer in microelectronic devices with environmental species such as water. Such substituent groups include, for example, F, Cl, Br, —CF₃, —OCH₃, —OCF₃, —O—Ph and alkyl of from one to eight carbon atoms, cycloalkyl of from three to about eight carbon atoms. For example, the moieties which can be unsubstituted or inertly-substituted aromatic moieties include:

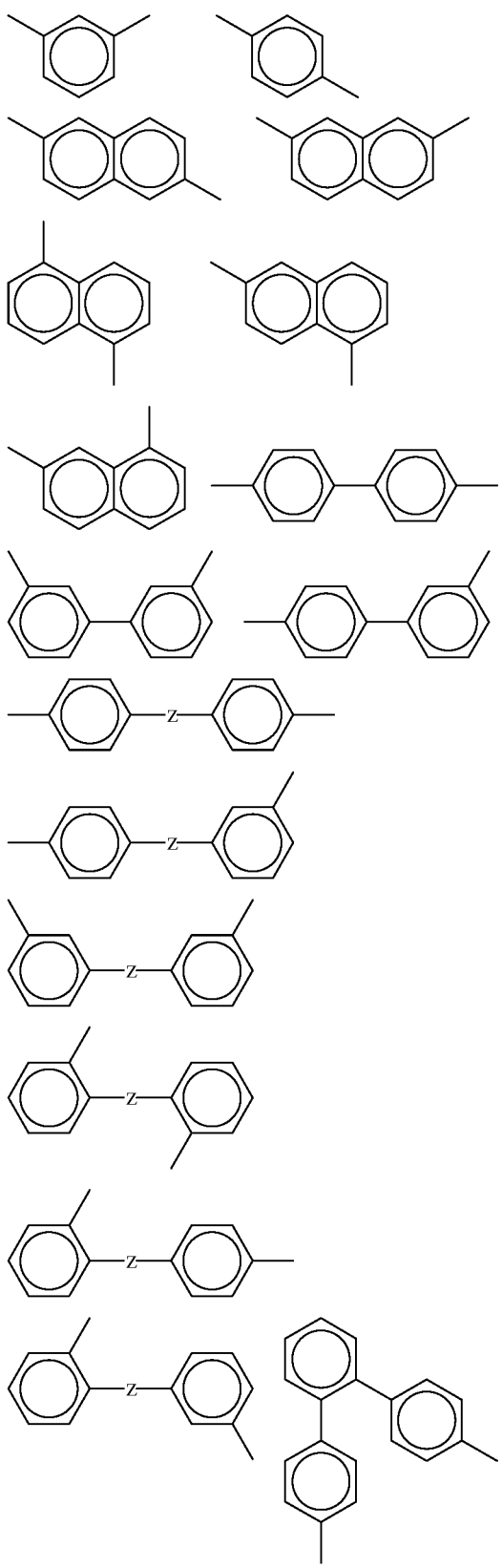

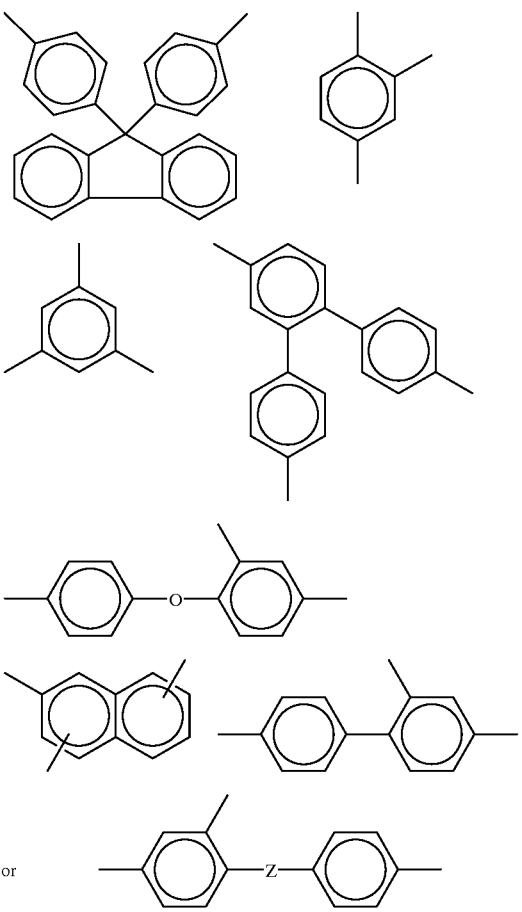

wherein Z can be: —O—, —S—, alkylene, —CF$_2$—, —CH$_2$—, —O—CF$_2$—, perfluoroalkyl, perfluoroalkoxy,

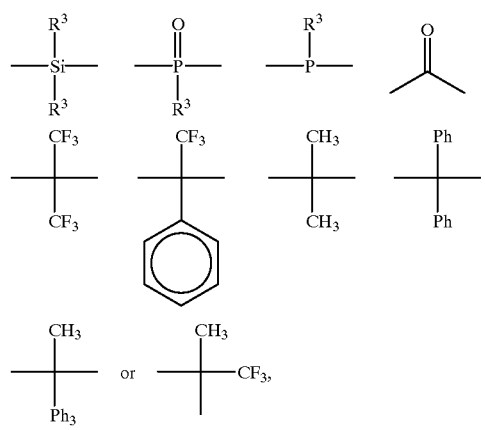

wherein each R$^3$ is independently —H, —CH$_3$, —CH$_2$CH$_3$, —(CH$_2$)$_2$CH$_3$ or Ph. Ph is phenyl.

II. Polyphenylene Oligomers and Polymers of the General Formulas:

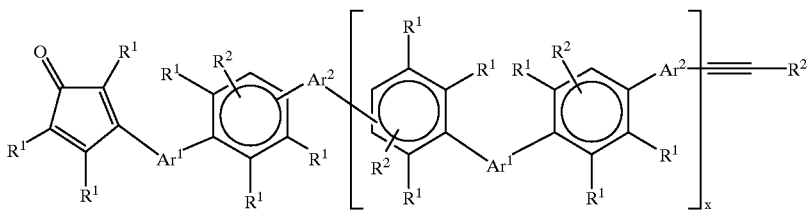

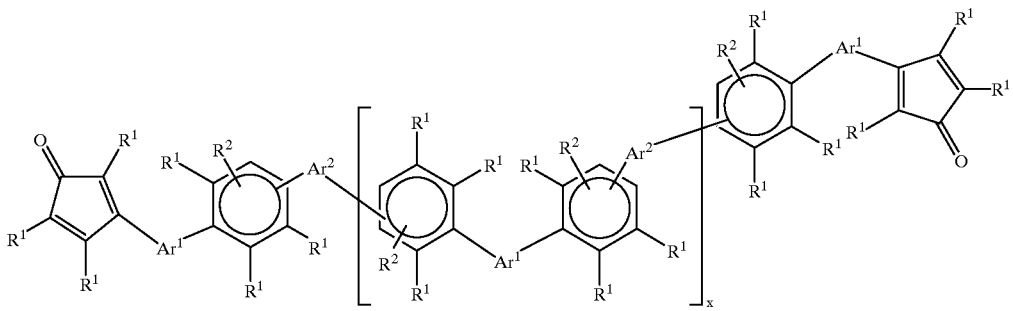

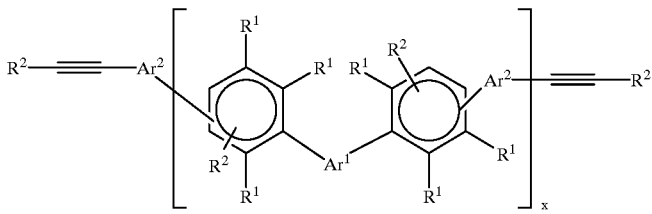

wherein $R^1$, $R^2$, $Ar^1$ and $Ar^2$ are as defined previously; and x is an integer from 1 to about 1000. Preferably, x is from 1 to about 50 and more preferably from 1 to about ten. Such oligomers and polymers can be prepared by the reaction of a biscyclopentadienone and a diacetylene of the general formulas:

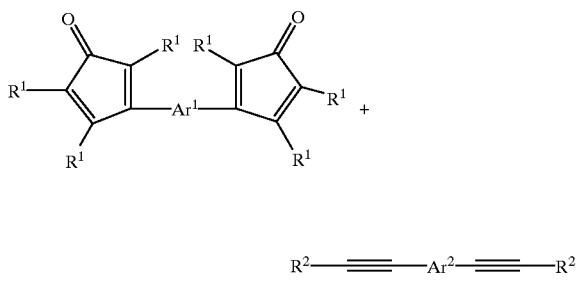

wherein $R^1$, $R^2$, $Ar^1$ and $Ar^2$ are as previously defined.

III. Polyphenylene Oligomers and Polymers Represented by the Formula:

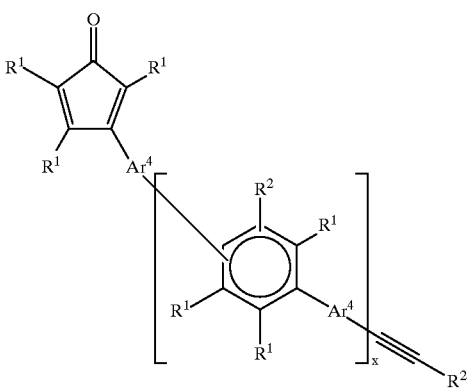

wherein $Ar^4$ is an aromatic moiety or an inertly-substituted aromatic moiety, $R^1$, $R^2$, and x are as previously defined, as can be prepared by the reaction of the cyclopentadienone functionality and the acetylene functionality of a polyfunctional compound of the general formula:

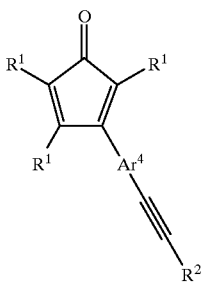

wherein $R^1$, $R^2$ and $Ar^4$ are as defined previously.

IV. Polyphenylene Oligomers and Polymers Represented by the Formula:

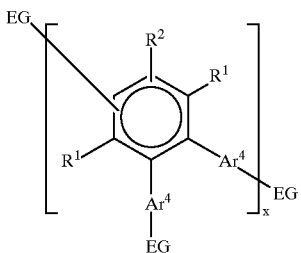

wherein EG is represented by any one of the formulas:

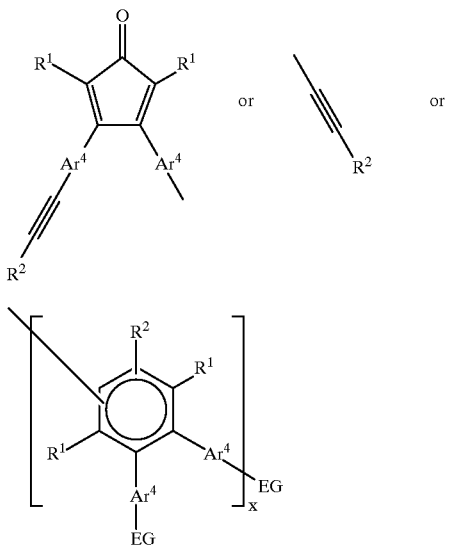

wherein $R^1$, $R^2$, $Ar^4$ and x are as defined previously, as can be prepared by the reaction of the cyclopentadienone functionality and the acetylene functionality of a polyfunctional compound of the general formula:

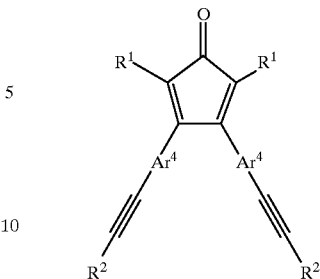

wherein $R^1$, $R^2$ and $Ar^4$ are as defined previously.

A polyfunctional compound containing two or more aromatic cyclopentadienone moieties may be made by the condensation of benzils with benzyl ketones using conventional methods. Exemplary methods are disclosed in Kumar et al. *Macromolecules*, 1995, 28, 124–130; Ogliaruso et al., *J. Org. Chem.*, 1965, 30, 3354; Ogliaruso et al., *J. Org. Chem.*, 1963, 28, 2725; and U.S. Pat. No. 4,400,540; all of which are incorporated herein by reference.

A polyfunctional compound containing two or more aromatic acetylene moieties may be made by conventional methods. An aromatic compound may be halogenated and then reacted with the appropriate substituted acetylene in the presence of an aryl ethynylation catalyst to replace the halogen with the substituted acetylene compound.

Once the polyfunctional compound monomers are made, they are preferably purified. In particular, in preparation for use as an organic polymer dielectric, metals and ionic species are removed. For example, the polyfunctional compounds containing aromatic acetylene groups may be contacted with a water wash, an aliphatic hydrocarbon solvent and then dissolved in an aromatic solvent and filtered through a purified silica gel. This treatment can remove residual ethynylation catalyst. Additional recrystallizations may also help in removal of undesired impurities.

While not intended to be bound by theory, it is believed that the polyphenylene oligomers and polymers are formed through the Diels Alder reaction of the cyclopentadienone groups with the acetylene groups when the mixtures of cyclopentadienones and acetylenes in solution are heated. These oligomers may contain cyclopentadienone and/or acetylene end groups and/or pendant groups. Upon further heating of the solution or an article coated with the solution, additional chain extension can occur through the Diels Alder reaction of the remaining cyclopentadienone end groups with the remaining acetylene groups resulting in an increase in molecular weight. Depending on the temperature used, reaction of the acetylene groups with each other may also occur.

The oligomers and polymers are shown in the structures as having either cyclopentadienone and/or acetylene end groups and/or pendant groups. In general, the end groups will depend on the relative concentration of cyclopentadienone to Diels Alder reactive acetylene functionality employed in the reaction, with a stoichiometric excess of cyclopentadienone functionality giving more cyclopentadienone end groups and a stoichiometric excess of Diels Alder reactive acetylene functionality giving a greater proportion of acetylene end groups.

A feature of a preferred embodiment of the invention is the halting of the polymerization reaction prior to the reaction of all the cyclopentadienone moieties. The oligomer may then be applied to a surface prior to advancing the polymerization to react the balance of the cyclopentadienone moieties. In such an oligomerized state the oligomer may planarize and gap fill when applied to a patterned surface. Preferably, at least ten percent of the cyclopentadienone moieties are unreacted. Most preferably, at least twenty percent of the cyclopentadienone moieties are unreacted. One may determine the percentage of unreacted cyclopentadienone moieties by spectral analysis. The cyclopentadienone moiety is highly colored in the visible spectrum with a distinct red or purple color which fades as the cyclopentadienone moieties react.

Planarize, as used herein, means that an isolated feature may be planarized by seventy percent or more, preferably by eighty percent or more and most preferably by ninety percent or more. The percentage or degree of planarization is calculated from the equation:

Percent Planarization=$(1-t_s/t_m)100$ when a layer of oligomer is coated over an isolated square line, one micrometer wide and one micrometer high at an average thickness of two microns and $t_s$ is the height of the oligomer or polymer over the feature above the average height of the oligomer or polymer and $t_m$ is the height of the feature (one micrometer). Use of this definition is illustrated, for example, in *Proceedings of IEEE*, Vol. 80, No. 12, December, 1992, at page 1948.

While not being bound by theory, the preparation of the polyphenylene polymer can be represented generally as follows:

heating, the carbonyl bridging species will be essentially fully converted to the aromatic ring system. When more than one acetylene-containing monomer is used, the oligomers and polymers formed are random, while the structures as drawn may suggest blocks are formed. The Diels Alder reaction between the cyclopentadienone and acetylene functionality can take place to form either a para- or meta-attachment on the phenylated ring.

Any inert organic solvent which can dissolve the monomers to the appropriate degree and can be heated to the appropriate polymerization temperature either at atmospheric, subatmospheric or superatmospheric pressure could be used. Examples of suitable solvents include mesitylene, pyridine, triethylamine, N-methylpyrrolidinone (NMP), methyl benzoate, ethyl benzoate, butyl benzoate, cyclopentanone, cyclohexanone, cycloheptanone, cyclooctanone, cyclohexylpyrrolidinone, and ethers or hydroxy ethers such as dibenzylethers, diglyme, triglyme, diethylene glycol ethyl ether, diethylene glycol methyl ether, dipropylene glycol methyl ether, dipropylene glycol dimethyl ether, propylene glycol phenyl ether, propylene glycol methyl ether, tripropylene glycol methyl ether, toluene, mesitylene, xylene, benzene, dipropylene glycol monomethyl ether acetate, dichlorobenzene, propylene carbonate, naphthalene, diphenyl ether, butyrolactone, dimethylacetamide, dimethylformamide and mixtures thereof. The preferred solvents are mesitylene, N-methylpyrrolidinone (NMP), gamma-butyrolactone, diphenylether and mixtures thereof.

Alternatively, the monomers can be reacted in one or more solvents at elevated temperature and the resulting

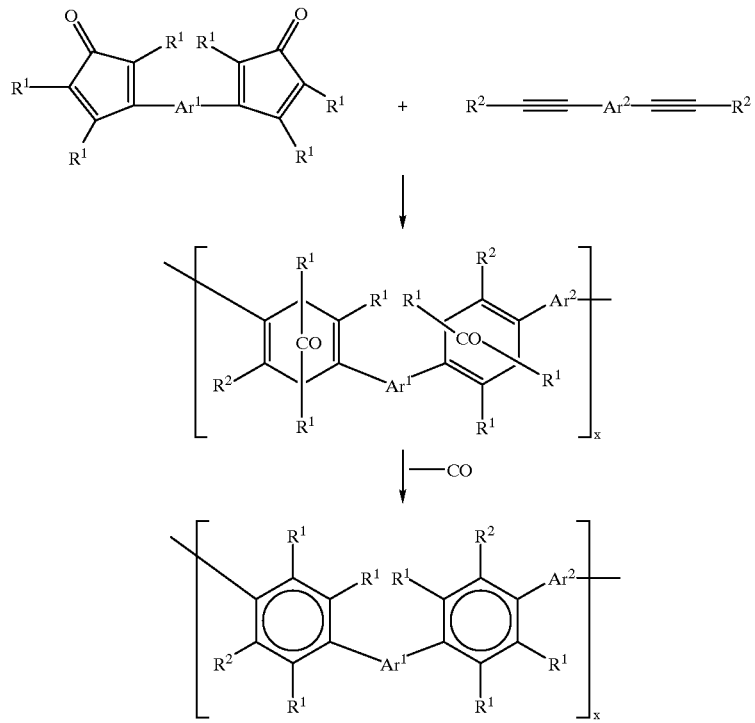

wherein $R^1$, $R^2$, $Ar^1$, $Ar^2$ and x are as defined previously.

Furthermore, while not specifically indicated in the structures, some of the carbonyl-bridged species may be present in the oligomers prepared, depending on the specific monomer and reaction conditions used. Upon further solution of oligomers can be cooled and formulated with one or more additional solvents to aid in processing, for example. In another approach, the monomers can be reacted in one or more solvents at elevated temperature to form oligomers which can then be isolated by precipitation into a non-solvent or by some other means of solvent removal to give essentially solvent-free oligomers. These isolated oligomers can then be redissolved in one or more different solvents and the resultant solutions can be used for processing.

The conditions under which the polymerization reaction is most advantageously conducted are dependent on a variety of factors, including the specific reactants and solvent. In general, the reaction is conducted under a non-oxidizing atmosphere such as a blanket of nitrogen or other inert gases. The reaction can be conducted neat (without solvent or other diluents). However, in order to ensure homogeneous reaction mixtures and to moderate exothermic reactions at such temperatures, it is often desirable to use inert organic solvents, such as those mentioned previously, for the reactants.

The time and temperature most advantageously employed will vary depending on the specific monomers employed, particularly their reactivity, the specific oligomer or polymer desired, and the solvent. In general, the reaction to form the oligomers is conducted at a temperature of from about 150° C. to about 250° C. and for a time of from about 60 minutes to about 48 hours. At this point the oligomers may be isolated from the reaction mixture or used as is in the coating of a surface. Additional chain extension (advancement) may be conducted at a temperature of from about 100° C. to about 475° C., preferably from about 200° C. to about 450° C. and for a time of from about 1 minute to about 10 hours, more preferably from about 1 minute to about 1 hour. An uncured or cured polymer may be used for coating a surface by casting from a solvent. While such a polymer may not gap fill or planarize sufficiently, it may still be useful in a damascene process.

The concentrations at which the monomers are most advantageously employed in the organic liquid reaction medium are dependent on a variety of factors including the specific monomers and organic liquid employed and the oligomer and polymer being prepared. In general, the monomers are employed in a cyclopentadienone to acetylene stoichiometric ratio of from about 1:1 to about 1:3, preferably at a 1:1 to 1:2 ratio.

The oligomer or polymer can be directly cast as a film, applied as a coating or poured into a non-solvent to precipitate the oligomer or polymer. Water, methanol, ethanol and other similar polar liquids are typical non-solvents which can be used to precipitate the oligomer. Solid oligomer or polymer may be dissolved and processed from a suitable solvent. If the oligomer or polymer is obtained in solid form, it may be further processed using conventional compression molding techniques or melt spinning, casting or extrusion techniques provided the solid precursor has a sufficiently low glass transition temperature.

More commonly, the oligomer or polymer is processed directly from the organic liquid reaction solution and the advantages of the present invention are more fully realized in that instance. Since the oligomer or polymer is soluble in the organic liquid reaction medium, the organic solution of the oligomer can be cast or applied and the solvent evaporated. Molecular weight increases (chain extension or advancement), and in some examples, crosslinking, to form the final polymer, occurs upon subsequent exposure to a sufficiently high temperature.

The polymer of this invention may be used as one or more of the insulating or dielectric layers in single or multiple layer electrical interconnection architectures for integrated circuits, multichip modules, or flat panel displays. The polymer of the invention may be used as the sole dielectric in these applications or in conjunction with other organic polymers or inorganic dielectrics, such as silicon dioxide, silicon nitride, or silicon oxynitride.

For example, coatings of oligomers and polymers of the invention, such as an electrically insulating coating used to fabricate interconnect structures on an electronic wafer, are easily prepared by spin-casting a film of, or otherwise coating a substrate with, the organic liquid solution of the oligomer or polymer and then evaporating the solvent and exposing the oligomer or polymer to temperatures sufficient to advance the oligomer or polymer to higher molecular weight, and in the most preferred examples, to a crosslinked polymer with high glass transition temperature.

The polymers of the present invention are particularly useful as a low dielectric constant insulating material in the interconnect structure of an integrated circuit, such as those fabricated with silicon or gallium arsenide. An integrated circuit would typically have multiple layers of metal conductors separated by one or more insulating materials. The polymer material of this invention can be used as insulation between discrete metal conductors in the same layer, and/or between conductor levels of the interconnect structure. The polymers of the present invention can also be used in combination with other materials, such as $SiO_2$ or $Si_3N_4$, in a composite interconnect structure. For example, the oligomers and polymers of the invention may be used in the process for making integrated circuit devices taught in U.S. Pat. No. 5,550,405; U.S. Pat. No. 5,591,677 and Hayashi et al., 1996 *Symposium on VLSI Technology Digest of Technical Papers*, pg 88–89, all of which are incorporated herein by reference. The oligomers and polymers of the invention may be substituted for the BCB or other resin disclosed in the process disclosed.

The oligomer, uncured polymer or polymer of the invention may be used as a dielectric in the above taught processes or similar processes to fabricate an integrated circuit article comprising an active substrate containing transistors and an electrical interconnect structure containing patterned metal lines separated, at least partially, by layers or regions of the composition of the invention.

The polymers of the present invention are also useful to planarize materials such as silicon wafers used in semiconductors to allow the production of smaller (higher density) circuitry. To achieve the desired planarity, a coating of the oligomer or polymer is applied from solution such as by spin coating or spray coating, to flow so as to level any roughness on the surface of the substrate. These methods are illustrated by such references as Jenekhe, S. A., *Polymer Processing to Thin Films for Microelectronic Applications* in Polymers for High Technology, Bowden et al. ed., American Chemical Society 1987, pp. 261–269.

In the fabrication of microelectronic devices, relatively thin defect-free films, generally from 0.01 to 20, preferably from 0.1 to 2 micrometer thickness, can be deposited on a surface of a substrate for example silicon, silicon-containing materials, silicon dioxide, alumina, copper, silicon nitride, aluminum nitride, aluminum, quartz, and gallium arsenide. Coatings are conveniently prepared from solutions of an oligomer having a molecular weight, for example, of 3000 $M_n$ or less and 5200 $M_w$ or less, in a variety of organic solvents such as xylene, mesitylene, NMP, gamma-butyrolactone and n-butyl acetate. The dissolved oligomer or polymer can be cast onto a substrate by common spin and spray coating techniques. The thickness of the coating may be controlled by varying the percent solids, the molecular weight, and thus the viscosity of the solution as well as by varying the spin speed.

The polyphenylene oligomer or polymer in this invention may be applied either by dip coating, spray coating, extrusion coating, or more preferably by spin coating. For all cases, the environment around the substrate and coating prior to cure may be controlled with respect to temperature and humidity. In particular, NMP may absorb water from the water vapor in the ambient air. When dissolved in NMP, one should protect the solution from moist air and cast the film in a low humidity environment. When using NMP as the solvent, preferably, the relative humidity is controlled at less than thirty percent and the temperature is controlled at 27 C or greater. The coating may be cured after application either with one or more hot plates, an oven, or a combination of these tools.

Adhesion promoters, such as those based on silane chemistry, may be applied to the substrate prior to the application of the polyphenylene oligomer or polymer solution, or added directly to the solution.

The oligomers and polymers of the present invention can be used in either a "damascene" metal inlay or subtractive metal patterning scheme for fabrication of integrated circuit interconnect structure. Processes for fabricating damascene lines and vias are known in the art. See for example U.S. Pat. Nos. 5,262,354 and 5,093,279.

Patterning of the material may be done with typical reactive ion etch procedures using oxygen, argon, nitrogen, helium, carbon dioxide, fluorine containing compounds, or mixtures of these and other gases, using a photoresist "softmask", such as an epoxy novolac, or a photoresist in combination with an inorganic "hardmask" such as $SiO_2$, $Si_3N_4$, or metal.

The oligomers and polymers may be used in conjunction with Al, Al alloys, Cu, Cu alloys, gold, silver, W, and other common metal conductor materials (for conductive lines and plugs) deposited by physical vapor deposition, chemical vapor deposition, evaporation, electroplating, electroless deposition, and other deposition methods. Additional metal layers to the basic metal conductors, such as tantalum, titanium, tungsten, chromium, cobalt, their alloys, or their nitrides, may be used to fill holes, enhance metal fill, enhance adhesion, provide a barrier, or modify metal reflectivity.

Depending on the fabrication architecture, either metal or the dielectric material of this invention may be removed or planarized using chemical-mechanical polishing techniques.

Multichip modules on active or passive substrates such as silicon, silicate glass, silicon carbide, aluminum, aluminum nitride, or FR-4, may be constructed with the polyphenylene polymer of this invention as a dielectric material.

Flat panel displays on active or passive substrates such as silicon, silicate glass, silicon carbide, aluminum, aluminum nitride, or FR-4, may be constructed with the polyphenylene polymer of this invention as a dielectric material.

The oligomers and polymers of the present invention may further be used as protective coatings on integrated circuit chips for protection against alpha particles. Semiconductor devices are susceptible to soft errors when alpha particles emitted from radioactive trace contaminants in the packaging or other nearby materials strike the active surface. An integrated circuit can be provided with a protective coating of the polymer of the present invention. Typically, an integrated circuit chip would be mounted on a substrate and held in place with an appropriate adhesive. A coating of the polymer of the present invention provides an alpha particle protection layer for the active surface of the chip. optionally, additional protection is provided by encapsulant made of, for example, epoxy or a silicone.

The polymers of the present invention may also be used as a substrate (dielectric material) in circuit boards or printed wiring boards. The circuit board made up of the polymer of the present invention has mounted on its surface patterns for various electrical conductor circuits. The circuit board may include, in addition to the polymer of the present invention, various reinforcements, such as woven nonconducting fibers, such as glass cloth. Such circuit boards may be single sided, as well as double sided or multilayer.

The polymers of the present invention may also be useful in reinforced composites in which a resin matrix polymer is reinforced with one or more reinforcing materials such as a reinforcing fiber or mat. Representative reinforcing materials include fiber glass, particularly fiber glass mats (woven or non-woven); graphite, particularly graphite mat (woven or non-woven); Kevlar™; Nomex™; and glass spheres. The composites can be made from preforms, dipping mats in monomer or oligomer, and resin transfer molding (where the mat is placed into the mold and monomer or prepolymer is added and heated to polymerize).

Layer(s) of the polymers of the present invention may be patterned by such means as wet-etching, plasma-etching, reactive-ion etching (RIE), dry-etching, or photo laser ablation, such as illustrated by *Polymers for Electronic Applications*, Lai, CRC Press (1989) pp. 42–47. Patterning may be accomplished by multilevel techniques in which the pattern is lithographically defined in a resist layer coated on the polymeric dielectric layer and then etched into the bottom layer. A particularly useful technique involves masking the portions of oligomer or polymer not to be removed, removing the unmasked portions of oligomer or polymer, then curing the remaining oligomer or polymer, for example, thermally.

In addition, the oligomer of the present invention may also be employed to make shaped articles, films, fibers, foams, and the like. In general, techniques well-known in the art for casting oligomers or polymers from solution may be employed in the preparation of such products.

In preparing shaped polyphenylene oligomer or polymer articles, additives such as fillers, pigments, carbon black, conductive metal particles, abrasives and lubricating polymers may be employed. The method of incorporating the additives is not critical and they can conveniently be added to the oligomer or polymer solution prior to preparing the shaped article. The liquid compositions containing the oligomer or polymer, alone or also containing fillers, may be applied by any of the usual techniques (doctoring, rolling, dipping, brushing, spraying, spin coating, extrusion coating or meniscus coating) to a number of different substrates. If the polyphenylene oligomer or polymer is prepared in solid form, the additives can be added to the melt prior to processing into a shaped article.

The oligomer and polymer of the present invention can be applied to various substrates by a number of methods such as, solution deposition, liquid-phase epitaxy, screen printing, melt-spinning, dip coating, roll coating, spinning, brushing (for example as a varnish), spray coating, powder coating, plasma-deposition, dispersion-spraying, solution-casting, slurry-spraying, dry-powder-spraying, fluidized bed techniques, welding, explosion methods including the Wire Explosion Spraying Method and explosion bonding, press bonding with heat, plasma polymerization, dispersion in a dispersion media with subsequent removal of dispersion media, pressure bonding, heat bonding with pressure, gaseous environment vulcanization, extruding molten polymer, hot-gas welding, baking, coating, and sintering. Mono- and multilayer films can also be deposited onto a substrate using a Langmuir-Blodgett technique at an air-water or other interface.

When applying the oligomer or polymer of the invention from solution, specific conditions of polymerization and other processing parameters most advantageously employed are dependent on a variety of factors, particularly the specific oligomer or polymer being deposited, the conditions of coating, the coating quality and thickness, and the end-use application, with the solvent being selected accordingly. Representative solvents which can be employed are those described previously.

Substrate(s) which can be coated with the oligomer or polymer of the invention can be any material which has sufficient integrity to be coated with the monomer, oligomer or polymer. Representative examples of substrates include wood, metal, ceramics, glass, other polymers, paper, paper board cloth, woven fibers, non-woven fiber mats, synthetic fibers, Kevlar™, carbon fibers, gallium arsenide, silicon and other inorganic substrates and their oxides. The substrates which are employed are selected based on the desired application. Exemplary materials include glass fibers (woven, non-woven or strands), ceramics, metals such as aluminum, magnesium, titanium, copper, chromium, gold, silver, tungsten, stainless steel, Hastalloy™, carbon steel, other metal alloys and their oxides, and thermoset and thermoplastic polymers such as epoxy resins, polyimides, perfluorocyclobutane polymers, benzocyclobutane polymers, polystyrene, polyamides, polycarbonates, polyarylene ethers and polyesters. The substrate can be the polymers of the present invention in cured form.

The substrate may be of any shape, and the shape is dependent on the end-use application. For instance, the substrate may be in the form of a disk, plate, wire, tubes, board, sphere, rod, pipe, cylinder, brick, fiber, woven or non-woven fabric, yarn (including commingled yarns), ordered polymers, and woven or non-woven mat. In each case the substrate may be hollow or solid. In the case of hollow objects, the polymer layer(s) is on either or both the inside or outside of the substrate. The substrate may comprise a porous layer, such as graphite mat or fabric, glass mat or fabric, a scrim, and particulate material.

The oligomers or polymers of the invention adhere directly to many materials such as compatible polymers, polymers having a common solvent, metals, particularly textured metals, silicon or silicon dioxide, especially etched silicon or silicon oxides, glass, silicon nitride, aluminum nitride, alumina, gallium arsenide, quartz, and ceramics. However, when increased adhesion is desired, a material may be introduced to improve adhesion.

Representative examples of such adhesion promoting materials are silanes, preferably organosilanes such as trimethoxyvinylsilane, triethoxyvinylsilane, hexamethyldisilazane [$(CH_3)_3$—Si—NH—Si$(CH_3)_3$], or an aminosilane coupler such as γ-aminopropyltriethoxysilane, or a chelate such as aluminum monoethylacetoacetatediisopropylate [$((isoC_3H_7O)_2Al(OCOC_2H_5CHCOCH_3))$]. In some cases, the adhesion promoter is applied from 0.01 weight percent to 5 weight percent solution, excess solution is removed, and then the polyphenylene applied. In other cases, for example, a chelate of aluminum monoethylacetoacetatediisopropylate, can be incorporated onto a substrate by spreading a toluene solution of the chelate on a substrate and then baking the coated substrate at 350° C. for 30 minutes in oxygen to form a very thin (for example 5 nanometer) adhesion promoting layer of aluminum oxide on the surface. Other means for depositing aluminum oxide are likewise suitable. Alternatively, the adhesion promoter, in an amount of, for example, from 0.05 weight percent to 5 weight percent based on the weight of the monomer, can be blended with the monomer before polymerization, negating the need for formation of an additional layer.

Adhesion can also be enhanced by surface preparation such as texturizing (for example, scratching, etching, plasma treating, or buffing) or cleaning (for example, degreasing or sonic cleaning); otherwise treating (for example, plasma, solvent, $SO_3$, plasma glow discharge, corona discharge, sodium, wet etching, or ozone treatments) or sand blasting the substrate's surface or using electron beam techniques such as 6 MeV fluorine ions; electrons at intensities of 50 to 2000V; hydrogen cations at 0.2 to 500 ev to 1 MeV; helium cations at 200 KeV to 1 MeV; fluorine or chlorine ions at 0.5 MeV; neon at 280 KeV; oxygen enriched flame treatment; or an accelerated argon ion treatment.

For application of the oligomerized product of the reaction of 3,3'-(oxydi-1,4-phenylene)bis(2,4,5-triphenylcyclopentadienone) and 1,3,5-tris(phenylethynyl) benzene, a more preferred embodiment of the invention, a silane based adhesion promoter, containing 3-aminopropyl silane dissolved in methoxy propanol, available as VM-652 from DuPont or AP8000 from The Dow Chemical Company, is first applied to the wafer surface; spun slowly to spread across the entire surface; allowed to stand for 2 seconds; and finally spun dry at 3000 rpm for 10 seconds. A solution of the oligomer is dispensed, 4 mL for a 200 mm wafer, by a high precision pump/filtration system, Millipore Gen-2, onto the wafer surface as the wafer is spun at 750 rpm. The wafer rotation is accelerated to 2000 rpm immediately following the dispense of the polymer solution and held at that spin speed for 20 seconds. A continuous stream of mesitylene is applied to the backside of the wafer for 5 seconds during the dispense of the oligomer solution. After spin coating, the film is dried on a hot plate at 70 C for 20 seconds. After the dry-bake step, the 2 mm to 5 mm edge bead of the coating is removed with a continuous stream of mesitylene while the wafer is spun at 2000 rpm; either by application from the backside or directly from the top near the edge. After the edge bead removal, the oligomer is further polymerized on a hot plate at 325° C. for 90 seconds under a nitrogen blanket. The film is crosslinked either on a hot plate at 450 C for 2 minutes under nitrogen or in a nitrogen purged oven at 450 C for 6 minutes.

The oligomer or polymer of the invention can be applied in combination with other additives to obtain specific results. Representative of such additives are metal-containing compounds such as magnetic particles, for example, barium ferrite, iron oxide, optionally in a mixture with cobalt, or other metal containing particles for use in magnetic media, optical media, or other recording media; conductive particles such as metal or carbon for use as conductive sealants, conductive adhesives, conductive coatings, electromagnetic interference (EMI)/radio frequency interference (RFI) shielding coating, static dissipation, and electrical contacts. When using these additives, the oligomer or polymer of the invention may act as a binder.

The oligomer or polymer of the invention may also be employed as protection against the environment (that is, protective against at least one substance or force in an object's environment, including conditions of manufacture, storage and use) such as coatings to impart surface passivation to metals, semiconductors, capacitors, inductors, conductors, solar cells, glass and glass fibers, quartz and quartz fibers.

The following examples are set forth to illustrate the present invention and should not be construed to limit its scope. In the examples, all parts and percentages are by weight unless otherwise indicated.

EXAMPLE 1

Preparation of Cyclopentadienone Compounds and Acetylene Compounds

Several cyclopentadienone compounds and acetylene compounds are prepared as described below. The structures of these compounds are set out in Table I, hereinafter.

A. 4-(4-(Phenylethynyl)phenyl)-2,3,5-triphenylcyclopentadienone (Compound A)

(a) Preparation of 4-bromophenylacetyl chloride

4-Bromophenylacetic acid (100 g, 0.465 mol), thionyl chloride (300 mL) and DMF (about 2 mL) are charged to a 1-liter round bottom 3-necked flask equipped with a reflux condenser and a mechanical stirrer. The reaction mixture is heated under nitrogen to 50° C. for 2 hours, using a charcoal scrubber for escaping gases. The thionyl chloride is evaporated and the product, 4-bromophenylacetyl chloride, is put into an addition funnel with benzene (30 mL).

(b) Preparation of 4-bromodeoxybenzoin

Benzene (200 mL) and aluminum chloride (74 g, 0.558 mol) are mixed into a flask and the mixture of 4-bromophenylacetyl chloride and benzene in Step (a) is added dropwise allowing the reaction to evolve HCl. The reaction mixture is stirred at room temperature for 1 to 1.5 hours and poured into ice water. Ethyl acetate (1 L) is added to dissolve the precipitated solids. The layers are separated and the organic layer is washed successively with 1 M aqueous HCl, saturated aqueous $NaHCO_3$, brine and then dried over $Na_2SO_2$. The solvent is then evaporated to give a solid material which is recrystallized from ethylacetate/hexanes to give the title compound in 84% yield as a yellow solid.

(c) Preparation of 4-Bromobenzil

Perchloric acid (250 mL), water (250 mL), ethylene glycol dimethyl ether (glyme) (500 mL), thallium (III) nitrate trihydrate (222.0 g, 0.5 mol) and 4-bromodeoxybenzoin (68.75 g, 0.25 mol) are charged to a 2-liter round bottom 3-necked flask equipped with a reflux condenser and a mechanical stirrer. The reaction mixture is heated under nitrogen to reflux for 6 hours. After cooling to ambient temperature, methylene chloride (500 mL) is added. The resulting bilayer is decanted off the precipitated Tl(I) salts formed. The layers are separated and the organic layer is washed with water, saturated aqueous $NaHCO_3$ and brine, followed by recrystallization of the resulting solid from 2-propanol gives the title compound.

(d) Preparation of 4-(Phenylethynyl)benzil

4-Bromobenzil (10.0 g, 0.0346 mol), phenylacetylene (3.88 g, 0.0380 mol), and $(PPh_3)_2PdCl_2$ (0.121 g, 0.0002 mol) in diethylamine (950 mL) is stirred at ambient temperature for 72 hours, followed by concentration to dryness. The residue is then taken up in methylene chloride. Standard aqueous workup followed by recrystallization from 2-propanol gives the title compound.

(e) Preparation of Compound A 4-(Phenylethynyl)benzil (20 g, 0.0644mol), 1,3-diphenylacetone (14.2 g, 0.0677 mol) and ethanol (150 mL) are heated to 75° C. Potassium hydroxide (KOH) (1.8 g, 0.0322 mol), dissolved in ethanol (15 mL), is added dropwise over a 15 minute period. The reaction mixture is heated to reflux for 30 minutes, then cooled to 40° C. and the precipitated product is filtered off, washed with cold ethanol and dried. Recrystallization from 2-propanol gives the title compound.

B. 3,3'-(1,4-Phenylene)bis(2,4,5-triphenylcyclopentadienone) (Compound B)

1,3-Diphenylacetone (1.23 g, 0.00584 mol), 1,4-bis (phenylglyoxaloyl)benzene, commercially available as Bis-PGB from Ken Seika Corporation (1.000 g, 0.00292 mol) and ethanol (50 mL) are added to a 100 mL 3-necked round bottom flask fitted with a reflux condenser/nitrogen inlet. The reaction mixture is heated to reflux and an aqueous KOH solution (0.112 g, 0.002 mol) in water (2.25 mL) is added. Additional KOH is added until the solution turns dark and stays dark. The mixture is refluxed for 45 minutes and then allowed to cool. A dark solid which precipitates is collected by filtration and analyzed by $^1$H-NMR, 13C-NMR, HPLC and FT-IR. All data is consistent with the formation of Compound B.

C. 4,4'-Bis(4-(phenylethynyl)phenoxy)-2,2',3,3',5,5',6,6'-octafluorobiphenyl (Compound C)

(a) Preparation of 4-Iodophenyl Acetate

4-Iodophenol (25.00 g, 0.114 mol) and methylene chloride (100 mL) are added to a 250-mL round bottom flask fitted with a condenser/nitrogen inlet, thermometer, and a dropping funnel. The slurry is stirred and pyridine (10.11 mL, 0.125 mol) is added via syringe. The reaction mixture is cooled to 10° C. using an ice bath and acetyl chloride (8.89 mL, 0.125 moles) is added dropwise. The mixture is stirred at 10° C. for 1 hour then allowed to warm to room temperature and stirred for 2 hours. The reaction mixture is filtered and the filtrate washed with water four times. The organic layer is dried ($MgSO_4$) and solvent removed in vacuo to give 27.3 g of an orange oil. NMR analysis is consistent with the structure of the desired product.

(b) Preparation of 4-(Phenylethynyl)phenyl Acetate

4-Iodophenyl acetate (50.00 g, 0.191 mol), phenylacetylene (23.40 g, 0.229 mol), and triethylamine (54 mL) are added to a 250-mL round bottom flask fitted with a condenser/nitrogen inlet, a thermometer, and a stopper. $PdCl_2(PPh_3)_2$ (0.200 g, 0.286 mmol) and $PPh_3$ (1.50 g, 5.73 mmol) are then added and the mixture heated to reflux. When the reaction mixture reaches 40° C., CuI (0.054 g, 0.286 mmol) is added. After 2 hours, the reaction is allowed to cool. The mixture is diluted with methylene chloride and poured into water (500 mL). The aqueous layer is extracted with methylene chloride (100 mL). The combined organic layers are washed with three 300-mL portions of water, dried ($MgSO_4$), and filtered. The solvent is removed in vacuo to give 49 g of a yellow solid. The material is recrystallized from hexanes to give light yellow crystals, mp 104.5° C. to 105.5° C.

(c) Preparation of 4-(Phenylethynyl)phenol 4-(Phenylethynyl)phenyl acetate (60.6 g, 0.256 moles), 20 percent aqueous sodium hydroxide (400 mL), and tetrahydrofuran (400 mL) are added to a 2-L Erlenmeyer flask and stirred at room temperature for 5 hours. The mixture is acidified with glacial acetic acid (120 mL) until a pH of 7 is reached. The aqueous layer is removed and extracted with tetrahydrofuran. The organic layers are combined and concentrated on a rotovap to give a tan solid. The solid is heated with hexanes (700 mL) on a steam bath and the hot solution decanted from the solid. This is repeated with a second volume of hexanes (700 mL). A white solid crystallizes from the hexane solution upon cooling and is isolated by filtration and dried in vacuo to give 18 g of a white solid, mp 126° C. to 127° C. NMR analysis is consistent with the structure of the desired material.

(d) Preparation of Compound C

Decafluorobiphenyl (5.00 g, 14.96 mmol), 4-(phenylethynyl)phenol (5.81 g, 29.93 mmol), potassium carbonate (16.54 g, 0.1197 mol), and dimethylacetamide (150 mL) are added to a 250-mL round bottom flask fitted with a condenser/nitrogen inlet, a thermometer, and a stopper. The mixture is stirred and heated to 70° C. for 16.5 hours. The reaction mixture is filtered to remove solids. The filtrate is added to water (500 mL) and extracted with methylene chloride. Brine is added to break an emulsion and the organic layer is separated and washed with water twice, then filtered through a plug of silica gel. Solvent is removed in vacuo leaving an oil. Methanol is added, forming a white solid which is isolated by filtration and dried in vacuo. NMR spectra are consistent with the structure of the title compound.

D. 4-(4-Ethynylphenyl)-2,3,5-triphenylcyclopentadienone (Compound D)

Compound D is prepared as in Example 1A using trimethylsilylacetylene in place of phenylacetylene followed by removal of the trimethylsilyl protecting group using a dilute base.

E. 3,4-Bis-(4-(phenylethynyl)phenyl)-2,5-diphenylcyclopentadienone (Compound E)

(a) Preparation of 4,4'-Dibromobenzoin

A solution of 4-bromobenzaldehyde (25.0 g, 0.135 mol), 3-ethyl-5-(2-hydroxyethyl)-4-methylthiazolium bromide (1.70 g, 0.0068 mol) and triethylamine (4.10 g, 0.0405 mol) in ethanol (125 mL) is stirred at room temperature for 60 hours. The reaction mixture is concentrated to dryness, then taken up in $CH_2Cl_2$ (150 mL), washed with 1 M HCl and saturated aqueous $NaHCO_3$ and dried $(Na_2SO_4)$, then concentrated, giving 25.2 g (100 percent) of a viscous yellow oil which solidifies upon standing at room temperature. 1H NMR ($CDCl_3$) δ 7.73 (d, J=8.5 Hz, 2H), δ 7.52 (d, J=8.5 Hz, 2H), 7.44 (d, J=8.2 Hz, 2H), 7.17 (d, J=8.2 Hz, 2H) $^{13}C$ NMR ($CDCl_3$) δ 197.33, 137.56, 132.33, 132.13, 131.90, 130.43, 129.46, 129.31, 122.93, 75.68.

(b) Preparation of 4,4'-Dibromobenzil

A solution of 4,4'-dibromobenzoin (20.2 g, 0.055 mol), ammonium nitrate (4.6 g, 0.0575 mol) and copper(II) acetate (0.100 g, 0.0005 mol) in 80 percent aqueous acetic acid (200 mL) is heated at reflux for three hours. The reaction mixture is cooled to room temperature and the product which crystallizes out is filtered off, washed with ethanol and dried, giving 13.0 g (64 percent) of product as a light yellow solid, mp 226° C. to 228° C. $^1H$ NMR ($CDCl_3$) δ 7.83 (d, J=8.5 Hz, 4H), 7.66 (d, J=8.5 Hz, 4H); $^{13}C$ NMR ($CDCl_3$) δ 192.25, 132.44, 131.45, 131.22, 130.7.

(c) Preparation of 4,4'-Bis(phenylethynyl)benzil

A solution of 4,4'-dibromobenzil (15.8 g, 0.0431 mol), phenylacetylene (5.06 g, 0.0495 mol), $(PPh_3)_2PdCl_2$ (0.151 g, 0.0002 mol) and CuI (0.820 g, 0.0043 mol) in diethylamine (150 mL) is heated at reflux overnight. The reaction mixture is concentrated to dryness, then taken up in $CH_2Cl_2$ (150 mL), washed with 1 M HCl, 10 percent $Na_2CO_3/H_2O$, brine and dried $(Na_2SO_4)$, then concentrated. Crystallization from 2-propanol gives 7.92 g (45 percent) as a light tan solid, mp 168° C. to 170° C. $^1H$ NMR ($CDCl_3$) δ 7.97 (d, J=8.2 Hz, 4H), 7.64 (d, J=8.2 Hz, 4H), 7.55 (m, 4H), 7.37 (m, 6H); $^{13}C$ NMR ($CDCl_3$) δ 193.03, 132.46, 132.03, 131.82, 130.21, 129.84, 129.06, 128.47, 122.37, 94.28, 88.55.

(d) Preparation of Compound E

A solution of KOH (0.34 g, 0.0061 mol) in ethanol (5 mL) is added dropwise to a solution of 4,4'-bis(phenylethynyl)benzil (5.0 g, 0.0122 mol) and 1,3-diphenylacetone (2.69 g, 0.0128 mol) in ethanol (75 mL) at 75° C. The resulting solution is heated at reflux for one hour, cooled to room temperature and the precipitate filtered off and dried. Digestion of the product from boiling ethanol gives 5.26 g product (74 percent) as a brick red solid: m.p. 222° C. (DSC); $^1H$ NMR ($CDCl_3$) δ 7.5 (bd, J=3.6 Hz, 4H), 7.34 (m, 5H), 7.25 (bs, 5H), 6.93 (d, J=8.0 Hz, 4H); $^{13}C$ NMR ($CDCl_3$) δ 199.02, 152.72, 132.31, 131.14, 130.83, 129.93, 129.67, 128.99, 128.04, 127.93, 127.71, 127.28, 125.31, 123.12, 122.46, 90.60, 88.71; MS (EI) 585 (28), 584 (M+, 56), 556 (19), 378 (36), 278 (100).

F. 3,4-Bis-(3-(phenylethynyl)phenyl)-2,5-diphenylcyclopentadienone (Compound F)

(a) Preparation of 3,3'-Dibromobenzoin

Prepared as in Example 1E(a), but from 3-bromobenzaldehyde (25.0 g, 0.135 mol), 3-ethyl-5-(2-hydroxyethyl)-4-methylthiazolium bromide (1.70 g, 0.0068 mol), and triethylamine (4.10 g, 0.0405 mol) in ethanol (125 mL), giving 24.8 g (99 percent) of a viscous yellow oil. $^1H$ NMR ($CDCl_3$) δ 8.04 (s, 1H), 7.75 (d, J=7.8 Hz, 1H), 7.61 (d, J=8.0 Hz, 1H), 7.47 (s, 1H), 7.26–7.15 (m, 4H), 5.87 (s, 1H); $^{13}C$ NMR ($CDCl_3$) δ 196.96, 140.48, 136.86, 134.94, 131.93, 131.86, 130.69, 130.63, 130.26, 127.57, 126.33, 123.19, 75.76.

(b) Preparation of 3,3'-Dibromobenzil

Prepared as in Example 1E(b), but from 3,3'-dibromobenzoin (24.8 g, 0.067 mol), ammonium nitrate (5.63 g, 0.070 mol) and copper(II) acetate (0.12 g, 0.0007 mol) in 80 percent aqueous acetic acid (200 mL), giving 17.0 g (69 percent) product as a light yellow solid. $^1H$ NMR ($CDCl_3$) δ 8.12 (s, 2H), 7.88 (d, J=7.8 Hz, 2H), 7.79 (d, J=7.9 Hz, 2H), 7.40 (dd, J=8.0, 8.0 Hz, 2H); $^{13}C$ NMR ($CDCl_3$) δ 191.58, 137.87, 134.27, 132.53, 130.60, 128.59, 123.39.

(c) Preparation of 3,3'-Bis(phenylethynyl)benzil

A solution of 3,3'-dibromobenzil (5.0 g, 0.0136 mol) and phenylacetylene (3.47 g, 0.0340 mol) in triethylamine (30 mL) is deaerated by bubbling nitrogen through the solution for ten minutes. $(PPh_3)_2PdCl_2$ (0.067 g, 0.0001 mol) is then added, and the reaction mixture heated at reflux overnight. The mixture is concentrated to dryness, then taken up in $CH_2Cl_2$ (100 mL), washed sequentially with 1 M HCl, saturated aqueous $NaHCO_3$ and dried $(Na_2SO_4)$, then concentrated, giving 3.67 g (66 percent) product as a white solid: m.p. 144° C. to 145° C.; $^1H$ NMR ($CDCl_3$) δ 8.12 (s, 2H), 7.96 (d, J=7.9 Hz, 2H), 7.81 (d, J=7.7 Hz, 2H), 7.52 (m, 6H), 7.36 (m, 6H); $^{13}C$ NMR ($CDCl_3$) δ 192.83, 137.40, 132.82, 131.52, 129.04, 128.58, 128.25, 124.50, 122.37, 91.11, 87.62.

(d) Preparation of Compound F

A solution of KOH (0.25 g, 0.0045 mol) in ethanol (5 mL) is added dropwise to a solution of 3,3'-bis(phenylethynyl)benzil (3.67 g, 0.0089 mol) and 1,3-diphenylacetone (2.07 g, 0.0098 mol) in ethanol (100 mL) at 75° C. The resulting solution is heated at reflux for one hour, then cooled to room temperature. The resulting precipitate is filtered off and dried. Digestion of the product from boiling ethanol gives 2.0 g (38 percent) product as a dark red solid: m.p. 208° C. (DSC). $^1H$ NMR ($CDCl_3$) δ 7.45 (bm, 6H), 7.31–7.21 (bm, 20H), 6.9 (d, J=7.9 Hz, 2H); $^{13}C$ NMR ($CDCl_3$) δ 199.38, 152.83, 132.87, 131.48, 131.25, 131.12, 129.80, 129.60, 128.53, 127.99, 127.92, 127.84, 127.70, 127.29, 125.03, 122.96, 122.47, 90.60, 88.71.

G. 1,3,5-Tris(phenylethynyl)benzene (Compound G)

Triethylamine (375 g), triphenyl phosphine (4.7865 g), palladium acetate (1.0205 g), and N,N-dimethyl formamide (2000 mL) are charged to a 5 liter 3-necked round bottom flask equipped with a thermocouple, an overhead mechanical stirrer, a condenser, an addition funnel, and a heating mantle with a temperature controller. This mixture is stirred for 5 minutes to dissolve the catalyst. Then diethylhydroxylamine (5 g), 1,3,5-tribromobenzene (190 g) and phenylacetylene (67.67 g) are added. The reactor is purged with nitrogen for 15 minutes, and then heated to 70° C. while maintaining a nitrogen atmosphere. After heating at 70° C. for 30 minutes, phenylacetylene (135.33 g) is slowly added dropwise over a period of about 1 hour, and the temperature increased to 80° C. Heating is continued an additional nine hours. The reaction is then cooled to room temperature and water (1 liter) is added which precipitates crude product. The product is filtered, washed three times with 500 mL portions of water, then once with 500 mL of cyclohexane. The crystals are vacuum dried at 75° C. overnight to give 226.40 g (99.1% yield) that is 97.25 area % pure by gas chromatography. The crystals are dissolved in toluene (1800 mL), refiltered through silica gel, and the solvent removed on a rotary evaporator to give 214.2 g (94.2% yield) that is 99.19 area % pure by gas chromatography. The residue is then recrystallized from a mixture of toluene (375 mL) and 2-propanol (696 mL). The white crystals are filtered, rinsed with a mixture of toluene (100 mL) and 2-propanol (400 mL), and vacuum dried at 75° C. overnight to give 1,3,5-tris(phenylethynyl)benzene (190.0 g, 83.91% yield) that is 99.83 area % pure by gas chromatography. Additional recrystallizations from toluene/isopropanol gives material of acceptable organic and ionic purity.

H. 4,4'-Bis(phenylethynyl)diphenyl Ether (Compound H)

To a 1-liter 3-necked round bottom flask with a thermocouple well equipped with an overhead mechanical stirrer, a condenser, and a heating mantle with a temperature controller are charged triethylamine (111.5 g), triphenyl phosphine (1.158 g), palladium acetate (0.2487 g), diethylhydroxylamine (1.24 g), 4,4'dibromodiphenyl ether (68.6 g), phenylacetylene (67.74 g), N,N-dimethyl formamide (136 mL) and 72 mL of water. The reactor is purged with nitrogen for 15 minutes, and then heated to 90° C. while maintaining a nitrogen atmosphere for 19 hours. The reaction is then cooled to room temperature and water (80 mL) is added. The crude product is filtered and the solids rinsed once with a 120 mL portion of toluene and four times with 160 mL portions of water to give, upon drying overnight under vacuum, 66.37 g (85.6% yield) of fine white needles of 4,4'-bis(phenylethynyl)diphenyl ether that are 99.64 area % pure by gas chromatography.

I. 4,4"-Bis(phenylethynyl)-o-terphenyl (Compound I)

(a) Preparation of 4,4"-Dibromo-o-terphenyl o-Terphenyl (100 g), Fe (5 g) and $CHCl_3$ (475 mL) are charged to a 1-L 3-necked flask equipped with a mechanical stirrer, a condenser connected to an HBr trap and an addition funnel. The mixture is stirred and temperature is maintained by a water bath. $Br_2$ (47.5 mL) in $CHCl_3$ (150 mL) is added dropwise over a period of 2.5 hours. The mixture is stirred at room temperature for an additional two hours. GC showed 5 percent monobromo-o-terphenyl, 81 percent dibromo-o-terphenyl and 9 percent tribromo-o-terphenyl.

Ice and 2 N NaOH solution are added to the above solution until it is basic. The upper layer is decanted and the $CHCl_3$ solution washed with more water. Sodium sulfate is added to the $CHCl_3$ solution which is then filtered through a Buchner funnel filled with celite. Chloroform is removed. To the white solid is added 750 mL of glacial acetic acid and the slurry is heated with a water bath at 95° C. About half of the solid dissolves. The hot solution is decanted into a 1000 mL beaker. The residue solid is 71 g which consists of 1.4 percent monobromo-o-terphenyl, 93 percent 4,4"-dibromo-o-terphenyl and 6 percent 4,4'4"-tribromo-o-terphenyl. The acetic solution is allowed to cool to room temperature. White crystals are collected. GC shows 1 percent monobromo-o-terphenyl, 83 percent 4,4"-dibromo-o-terphenyl, and 13 percent 4,4',4"-tribromo-o-terphenyl. This material is used in the preparation of 4,4"-bis(phenylethynyl)-o-terphenyl.

(b) Preparation of Compound I 4,4"-Dibromo-o-terphenyl (40 g, 0.0103 mol), phenylacetylene (50 mL), triethylamine (500 mL) and pyridine (300 mL) are charged to a 1000 mL 4-necked flask equipped with a mechanical stirrer, a condenser, $N_2$ inlet and a thermometer. Nitrogen is used to purge the system for 20 minutes.

After the solid is dissolved, 2.783 g of $Pd(PPh_3)_2Cl_2$, 2.538 g of CuI, and 5.545 g of $PPh_3$ are added. Nitrogen is bubbled through the solution with stirring for 30 minutes. Heat is turned on to reflux the mixture. Refluxing is maintained overnight. White solid forms during the reaction.

The solution is put into a 2-L beaker which contains ice. The flask is rinsed with water several times and poured into the beaker. The solid formed is filtered with a Buchner funnel and then washed several times with water. Toluene is used to dissolve the solid in a 2-L beaker. The upper layer is decanted into a 1-L flask. The lower layer which contains undissolved materials is rinsed with toluene and the toluene solution is combined with the decanted upper layer, forming a deep brown solution. The deep brown solution is decolorized with charcoal. The solution is heated in a water bath while being stirred. $Na_2SO_4$ is then added.

The solution is filtered with a sintered glass filter and the solvent is rotovapped off. The solid is dissolved in a 2-L beaker with 350 mL of hot toluene and, once dissolved, 1300 mL of isopropanol is added to crystallize the solid. The 2-L beaker is put into the refrigerator overnight, the crystals are then collected, and washed with isopropanol. The yellow solid weighs 25 g. The yellow solid is washed with acetone and then crystallized twice in ethyl acetate. Yield of white flakes is 12 g.

J. 4,4'-Diethynyldiphenyl ether (Compound J)

A slurry of 4,4'-dibromodiphenyl ether (9.8 g, 0.030 mol), $Pd(OAc)_2$ (0.05 g, 0.0002 mol), copper(I) iodide (0.15 g, 0.0008 mol) and triphenylphosphine (1.0 g, 0.0038 mol) in triethylamine (40 mL) is sparged with nitrogen for 30 minutes, while slowly heating to reflux. 2-Methyl-3-butyn-2-ol (7.6 g, 0.090 mol), which is sparged with nitrogen for 30 minutes, is rapidly added to the refluxing solution over a 5 minute period. The resulting reaction mixture is heated at reflux for 14 hours, cooled to ambient temperature, and concentrated to dryness. The residue is taken up in $CH_2Cl_2$, washed with water and brine, then concentrated. The residue is taken up in toluene (200 mL) and sodium hydride (0.10 g, 0.20 mol) is added. The reaction mixture is heated to reflux and approximately 100 mL of the solvent is distilled off. The solution is cooled, then concentrated. The residue is taken up in $CH_2Cl_2$, washed with 1 N HCl, water, saturated aqueous $NaHCO_3$ and brine, then dried ($Na_2SO_4$) and concentrated, giving a dark colored oil. The residue is filtered through a pad of silica gel, eluted with $CH_2Cl_2$ and concentrated, giving a viscous oil which slowly solidifies upon standing. $^1$H NMR ($CDCl_3$) δ 7.45 (d, J=8.6 Hz, 4 H), 6.93 (d, J=8.7 Hz, 4 H), 3.04 (s, 2 H); $^{13}$C NMR ($CDCl_3$) δ 157.02, 133.93, 119.20, 118.94, 117.16, 83.16. The reaction scheme is as follows:

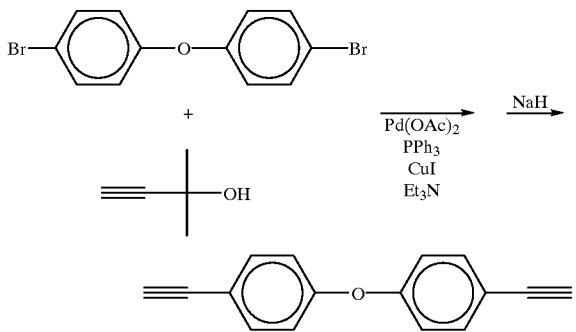

K. 3,3'-(Oxydi-1,4-phenylene)bis(2,4,5-triphenylcyclopentadienone) (Compound K)

(a) Preparation of 4,4'-diphenylacetyldiphenyl ether

To a slurry of aluminum chloride (97.9 g, 0.734 mol) in methylene dichloride (200 mL) at 0° C. is added, dropwise, a solution of diphenyl ether (50.0 g, 0.294 mol) and phenylacetyl chloride (102 g, 0.661 mol) in methylene chloride (50 mL), over a 30 minute period. When the addition is completed, the reaction mixture is allowed to warm to ambient temperature and stirred overnight. The reaction mixture is carefully poured, with stirring, into 1.5 kg of ice/water. Methylene chloride (1500 mL) is added to dissolve the solids and the layers are separated. The organic layer is filtered through celite, then concentrated to dryness. Recrystallization from toluene gives 110 g (92 percent) of the title compound as light tan prisms.

(b) Preparation of 4,4'-Bis(phenylglyoxaloyl)diphenyl Ether

Aqueous HBr (97 mL of a 48 weight percent solution) is added to a slurry of 4,4'-diphenylacetyldiphenyl ether (50.0 g, 0.123 mol) in DMSO (400 mL) and the resulting mixture is heated to 100° C. for two hours, then cooled to ambient temperature. The reaction mixture is partitioned between toluene (500 mL) and water (750 mL). The organic layer is washed with water (3×250 mL), followed by washing with brine, and concentration to give a viscous, bright yellow oil which solidified upon standing at ambient temperature. Recrystallization from ethanol gives 35.9 g (67 percent) of the title compound as bright yellow cubes.

(c) Preparation of Compound K

To a nitrogen purged 5-L Morton flask equipped with a thermocouple, reflux condenser with nitrogen inlet, mechanical stirrer, and addition funnel is added, 195.4 g (0.4498 mol, 1.0 eq) 4,4'-bis(phenylglyoxaloyl)diphenyl ether, 193.9 g diphenylacetone (0.9220 mol, 2.05 eq), and 2.5 L deoxygenated ethanol. The mixture is heated to reflux, at which point a homogeneous solution is attained, and the solution is sparged with nitrogen for 30 minutes. To the addition funnel is added a solution containing 25.2 g KOH (0.4498 mol, 1.0 eq), 200 mL ethanol, and 25 mL water. The temperature is reduced to 74° C. and the KOH solution is added rapidly over 5 minutes. An exothermic reaction is quickly established and maintains reflux until three quarters of the solution is added whereafter the temperature begins to decrease. A dark purple color is observed immediately upon addition of base and solid is observed before addition is complete. After complete addition, the heterogeneous solution is heated at strong reflux for 15 minutes and much solid product is formed. The mixture is allowed to cool to 25° C. and 29.7 g glacial acetic acid (0.4948 mol, 1.1 eq.) is added and stirred for 30 minutes. The crude product is isolated by filtration and washed in the filter funnel with, 1 L water, 3 L EtOH, 2 L MeOH, and dried for 12 hours at 60° C. to 90° C. under vacuum giving 323 g (92%) crude DPO-CPD which is 94% pure by LC. The crude material is dissolved in HPLC grade methylene chloride (10 wt%), transferred to a 5-L Morton flask equipped with a bottom flush valve and mechanical stirrer, and washed vigorously for 10 to 90 minutes, 2 to 7 times with equal volume portions of low ionic water. The $CH_2Cl_2$ solution is then flashed through a 5 cm column containing 75 g of silica gel in $CH_2Cl_2$. The column is washed with an additional 1 L $CH_2Cl_2$ at which point the filtrate is essentially clear. The solution is evaporated to dryness and re-dissolved in THF and evaporated again to remove the bulk of the residual methylene chloride. The powder is transferred to a 5 L flask equipped with addition funnel and Friedrichs reflux condenser, and dissolved (0.07–0.12 g/mL) in deoxygenated HPLC THF at reflux. An additional 1 L THF is then added and a nitrogen sparge tube is inserted into the solution. The solution is sparged with nitrogen for three hours and the THF is condensed at 45° C. to 50° C. while residual methylene chloride is removed by distillation. A distillation head is attached and 700 mL to 1 L THF is removed. The solution is then allowed to slowly cool over several hours to room temperature then cooled with an ice bath to below 10° C. during which time crystallization occurs. The crystals are isolated using a 5 μm PTFE filter in a 4-L Millipore clamp-frit suction filtration flask. The crystals are then washed with 1-L MeOH and dried over night at 80° C. to 90° C. under vacuum giving 70 to 85% yield DPO-CPD with 99% LC purity, mp 270° C.

L. 2,4,4'-Tris(phenylethynyl)diphenyl ether (Compound L)

(a) Preparation of 2,4,4'-tribromodiphenyl ether

Bromine (57.3g, 0.358 mol) is slowly added dropwise to neat stirring diphenyl ether (20.0 g, 0.118 mol) at 40° C. During the addition, the temperature is slowly raised to 600C and the reaction is maintained at that temperature for two hours. The mixture is then heated to 70° C. for 30 minutes, then cooled to ambient temperature. The mixture is taken up in $CH_2Cl_2$ (100 mL), washed with 10 percent aqueous $Na_2CO_3$, then dried ($Na_2SO_4$) and concentrated, giving 44.8 g (100 percent) product as a tacky oil which slowly solidifies upon standing at ambient temperature.

(b) Preparation of Compound L

A slurry of 2,4,4'-tribromodiphenyl ether (44.3 g, 0.116 mol), $Pd(OAc)_2$ (0.182 g, 0.00081 mol), copper (I) iodide (574 g, 0.00302 mol) and triphenylphosphine (3.95 g, 0.0151 mol) in triethylamine (300 mL) is sparged with nitrogen for 30 minutes, while slowly heating to reflux.

Phenylacetylene (41.4 g, 0.406 mol), which is sparged with nitrogen for 30 minutes, is rapidly added to the refluxing solution over a 5 minute period. The resulting reaction mixture is heated at reflux for 14 hours. The solution is cooled to ambient temperature and concentrated. The residue is taken up in $CH_2Cl_2$, washed with 1 N HCl, water, saturated aqueous $NaHCO_3$ and brine, then concentrated to 100 mL volume. This solution is filtered through a pad of silica gel, eluted with methylene chloride and the resulting filtrate concentrated. The residue is crystallized from EtOAc/hexanes to give 39.0 g (73 percent) as a light tan solid, mp 123° C. to 126° C. $^1H$ NMR (CDCl$_3$) δ 7.77 (bs, 1 H), 7.53–7.44 (m, 14 H), 7.34–7.26 (m, 20 H), 6.98 (dd, J=8.0, 8.0, 2 H); $^{13}C$ NMR (CDCl$_3$) δ 156.81, 156.00, 136.49, 132.93, 132.57, 131.31, 131.22, 128.23, 128.10, 128.06, 127.99, 127.87, 123.04, 122.74, 122.51, 119.63, 119.09, 118.67, 117.84, 116.30, 95.05, 89.47, 88.72, 87.79, 83.87.

M. 3,3'-(1,4-Phenylene)bis(2,5-di-(4-fluorophenyl)-4-phenylcyclopentadienone) (Compound M)

1,3-Bis(4-fluorophenyl)-2-propanone (1.476 g, 0.006 mol) and 1,4-bis(phenylglyoxaloyl)benzene, available as Bis-PGB from Ken Seika Corporation (1.026 g, 0.003 mol), are dissolved in 90 mL of 1-propanol and benzyltrimethylammonium hydroxide (0.32 g, 40 percent in methanol) is added. The solution immediately turns purple. Reflux is continued for 2 hours. The mixture is cooled to room temperature and then at 0° C. Solid is collected and washed with cold methanol. Yield is 1.92 g. The solid has a metallic shiny color and melts at 316° C. as measured by DSC.

1,3-Bis(4-fluorophenyl)-2-propanone is prepared following the procedure described in E. Elce, A. S. Hay, *J. Poly. Sci.: Part A: Polymer Chemistry*, 33, 1143–1151 (1995).

N. 4,4',4''-Tris(phenylethynyl)-o-terphenyl (Compound N)

(a) Preparation of 4,4',4''-Tribromo-o-terphenyl o-Terphenyl (39.6 g), Fe (3.3 g) and $CHCl_3$ (450 mL) are charged to a 1-L 3-necked flask equipped with a mechanical stirrer, a condenser connected to an HBr trap and an addition funnel. The mixture is stirred and temperature is maintained by a water bath. $Br_2$ (26.5 mL) in $CHCl_3$ (100 mL) is added dropwise over a period of 1.5 hours. The mixture is stirred at room temperature for an additional 2 hours and then at 65° C. for 2 hours. GC showed 14 percent dibromo-o-terphenyl, 85 percent tribromo-o-terphenyl and 0.7 percent tetrabromo-o-terphenyl.

Ice and 2 N NaOH solution are added to the solution until it is basic. The upper layer is decanted and the $CHCl_3$ solution is washed with more water. Sodium sulfate is added to the $CHCl_3$ solution which is then filtered through a Buchner funnel filled with celite. Chloroform is removed. The white solid is mixed with 750 mL glacial acetic acid and the slurry is heated with a water bath at 95° C. Yield of solid after all acetic acid is removed is 42.5 g, consisting of 11 percent 4,4''-dibromo-o-terphenyl, 88 percent 4,4',4''-tribromo-o-terphenyl and 0.6 percent tetrabromo-o-terphenyl. The solid is used in the preparation of 4,4',4''-tris(phenylethynyl)-o-terphenyl. The acetic acid solution contained 56 percent 4,4''-dibromo-o-terphenyl, 36 percent 4,4',4''-tribromo-o-terphenyl and 1.8 percent tetrabromo-o-terphenyl.

(b) Preparation of Compound N 4,4',4''-Tribromo-o-terphenyl (24.7 g, 0.053 mol), phenylacetylene (22 mL), triethylamine (280 mL) and pyridine (180 mL) are charged to a 1000-mL 4-necked flask equipped with a mechanical stirrer, a condenser, and $N_2$ inlet and a thermometer. Nitrogen is used to purge the system for 20 minutes.

After the solid is dissolved, $Pd(PPh_3)_2Cl_2$ (1.113 g), CuI (1.005 g) and $PPh_3$ (2.218 g) are added. Nitrogen is bubbled through the solution with stirring for 30 minutes. Heat is turned on and the mixture is refluxed overnight. White solid forms during the reaction.

The solution is put into a 2-L beaker which contains ice. The flask is rinsed with water several times and poured into the beaker. The gummy solid formed is filtered with a Buchner funnel and then washed several times with water. Toluene is used to dissolve the solid in a 2-L beaker. The upper layer is decanted into a 1-L flask. The lower layer which contains undissolved materials is rinsed with toluene and the toluene solutions are combined, forming a deep brown solution which is subsequently decolorized with charcoal. The solution is heated in a water bath while being stirred. $Na_2SO_4$ is then added. The solution is filtered with a sintered glass filter and the solvent is rotovapped off. The gummy solid is dissolved in a 2-L beaker with 600 mL of hot acetone. The crystals are then collected and washed with acetone. The light yellow solid weighs 11 g. The solid is crystallized twice from ethyl acetate. Yield of white powder is 8 g.

O. 1,3-Bis(phenylethynyl)benzene (Compound O)

Phenylacetylene (8.0 g, 78.3 mmol), 1,3-dibromobenzene (6.24 g, 26.5 mmol), bis(triphenylphosphine)palladium(II) chloride (0.557 g, 0.794 mmol), triphenylphosphine (1.11 g, 4.23 mmol), copper(I) iodide (0.503 g, 2.64 mmol), pyridine (73 mL, 0.93 mol), triethylamine (110 mL), 0.783 mol) are mixed and stirred under nitrogen for 30 minutes. The mixture is then refluxed overnight. The solution is poured into a water/ice bath. The solid which forms is collected and washed with water. The solid is dissolved in toluene and the insoluble material is filtered off. The toluene solution is decolorized with charcoal. Isopropanol is added, forming yellow crystals. The crystals are isolated by filtration and weigh 4.0 g (13.1 mmol, 50 percent yield). Melting point is 109° C. (DSC). NMR and mass spectroscopic analyses are consistent with the proposed structure of 1,3-bis (phenylethynyl)benzene.

P. 1,4-Bis(phenylethynyl)benzene (Compound P)

Compound P is prepared as in Compound O except that 1,4-dibromobenzene is used instead of 1,3-dibromobenzene.

Q. 1,2,4-Tris(phenylethynyl)benzene (Compound Q)

A slurry of 1,2,4-tribromobenzene (20.0 g, 0.0635 mol) in triethylamine (250 mL) is degassed by sparging with $N_2$ for 30 minutes. Triphenylphosphine (2.2 g, 0.00836 mol) is added, followed by $Pd(OAc)_2$ (0.100 g, 0.000445 mol) and CuI (0.315 g, 0.00165 mol), and the resulting mixture is heated to reflux. Phenylacetylene (20.1 g, 0.197 mol), which is sparged with $N_2$ for 30 minutes, is added dropwise over a 10 minute period. The reaction mixture is heated at reflux overnight. The reaction mixture is cooled to ambient temperature and concentrated to dryness. The residue is taken up in acetone (200 mL) and water (300 mL) is slowly added with stirring. The precipitate is filtered off, washed with methyl alcohol (500 mL), then water (200 mL) and dried, giving a light tan colored solid which is further purified by recrystallization from acetone/methanol, giving a white solid in 60% yield. NMR analysis is consistent with the structure of the desired material. The reaction scheme is as follows:

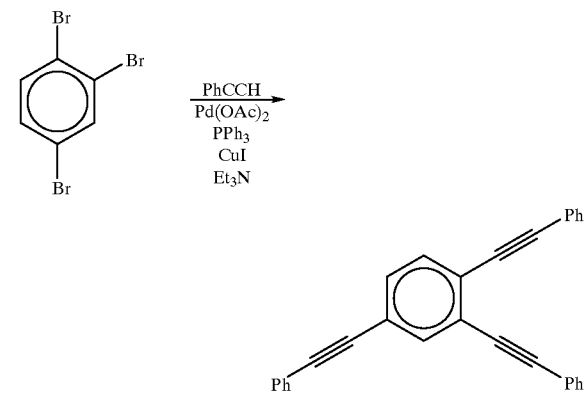

EXAMPLE 2

Preparation of Polymer from Compound M and a Mixture of 1,3-bis(phenylethynyl)benzene (Compound O) and 1,3,5-tris(phenylethynyl) benzene (Compound G)

Compound (M) (316 mg, FW=762, 0.415 mmol), Compound (O) (72 mg, FW=278, 0.259 mmol) and Compound (G) (44 mg, 0.116 mmol) are refluxed in 1,3-diisopropylbenzene (4 mL) for 42 hours. The dark solution turns red and becomes viscous. The solution is spin-coated on a wafer and cured at 400° C. for 1 hour, forming a film. The reaction scheme is as follows:

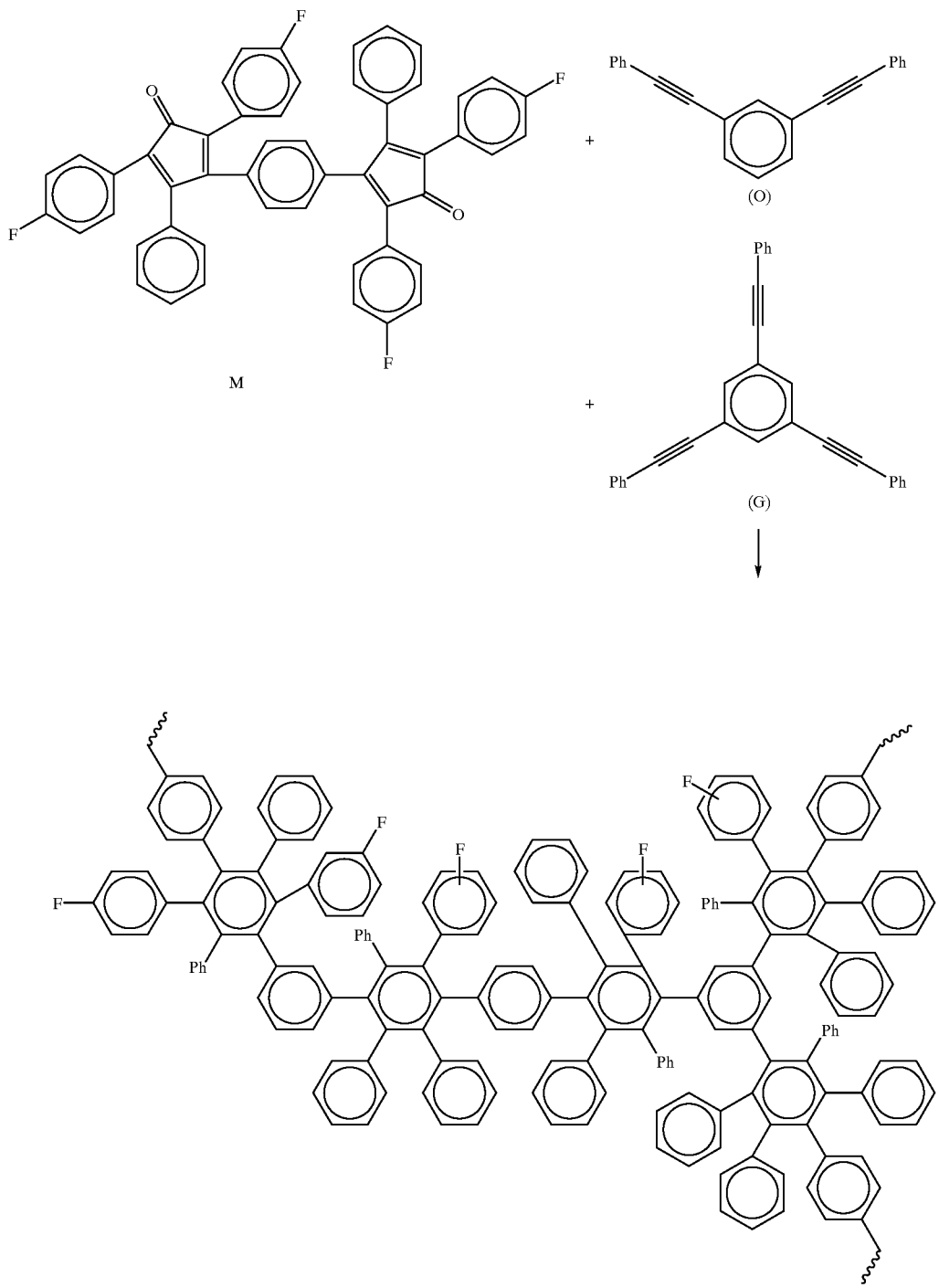

EXAMPLE 3

Preparation of Polymer from Compound M and a Mixture of 4,4'-bis(phenylethynyl)-o-terphenyl (Compound I) and 4,4',4''-tris(phenylethynyl)-o-terphenyl (Compound N)

Compound (M) (316 mg, 0.415 mmol), Compound (I) (107 mg, FW=430, 0.249 mmol) and Compound (N) (88 mg, FW=530, 0.166 mmol) are refluxed in 5 mL of 1,3-diisopropylbenzene for 48 hours. The yellow viscous solution is cooled to room temperature and spin-coated on a wafer. The polymer is cured at 400° C. for 1 hour, forming a film. The reaction scheme is as follows:

31
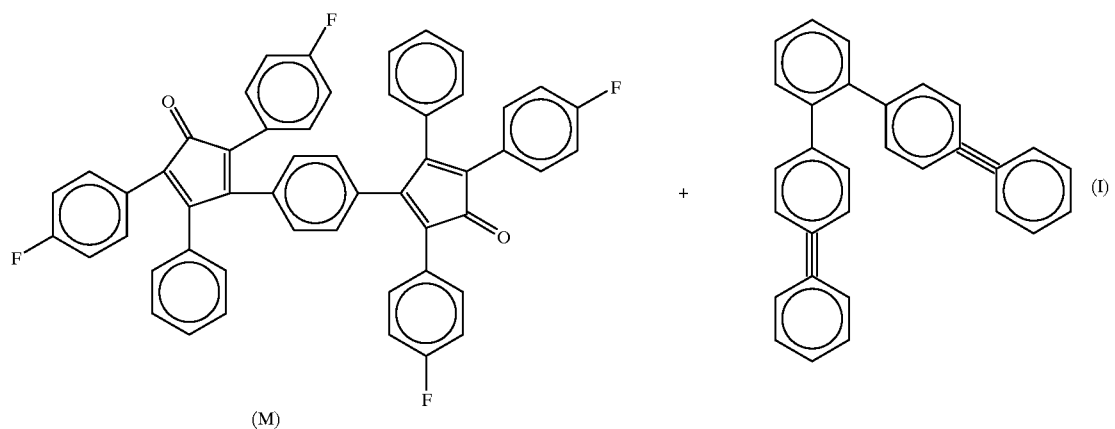
(M)
32
(I)
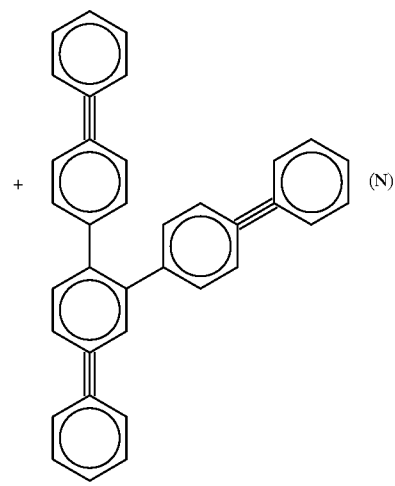
(N)
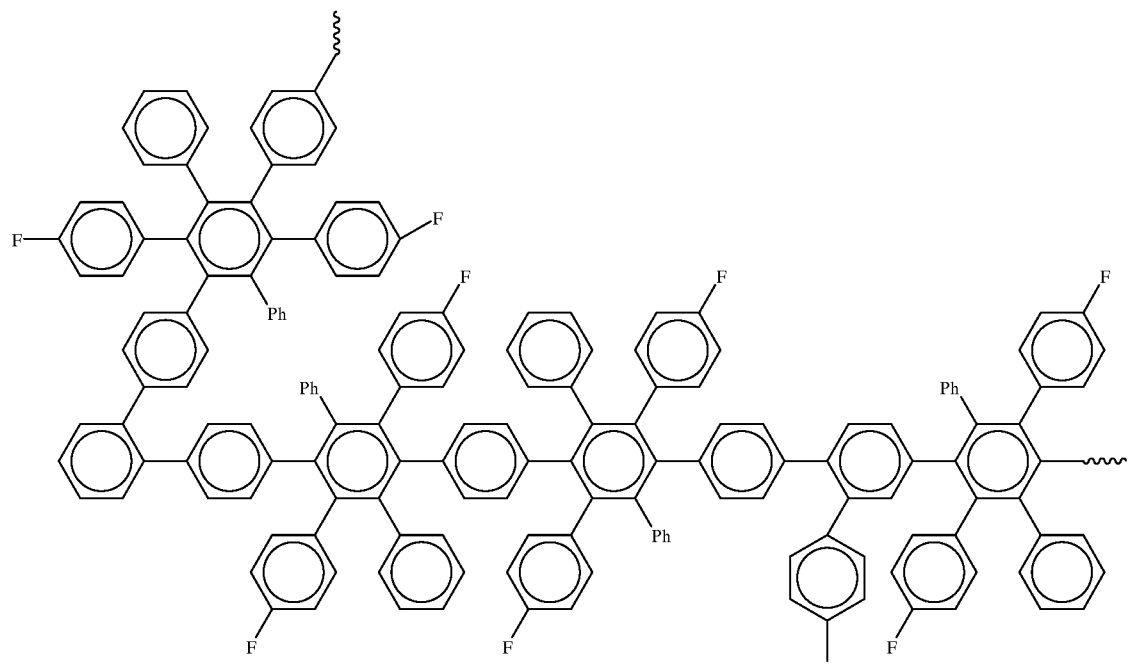

-continued

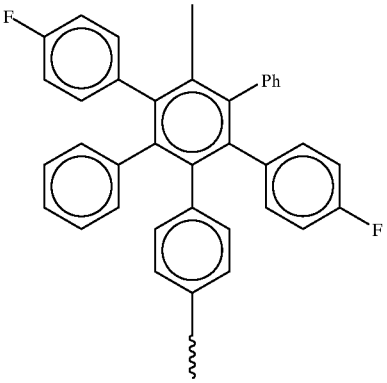

EXAMPLE 4

Preparation of Polymer from 3,3'-(oxydi-1,4-phenylene)bis(2,4,5-triphenylcyclopentadienone) (Compound K) and 4,4'-Bis(phenylethynyl) Diphenyl Ether (Compound H)

3,3'-(Oxydi-1,4-phenylene)bis(2,4,5-triphenylcyclopentadienone) (15.0000 g, 0.019158 mol), 4,4'-bis(phenylethynyl)diphenyl ether (7.0974 g, 0.019158 mol), and N-methylpyrrolidinone (51.60 g) are added to a 250-mL round bottom flask. The flask is attached to a nitrogen inlet and the magnetically stirred solution is heated to 200° C. in an oil bath. After 19.5 hours at 200° C., gel permeation chromatography indicates a $M_n$ of 1551 and a $M_w$ of 2383 relative to a polystyrene standard. The solution is allowed to cool and is bottled. A portion of the solution is taken up in a syringe and filtered through a 1.0 micron syringe filter onto a 4" silicon wafer. The wafer is spin-coated at 2000 rpm for 60 seconds under a heat lamp which warms the wafer. The coated wafer is then placed on a hot plate set to 90° C. for several minutes. The wafer is then placed in a nitrogen purged oven where it is cured by purging at room temperature for 45 minutes then heated to 400° C. at 10° C./min, held at 400° C. for 1 hour, then allowed to cool to room temperature. The resulting wafer is thus coated with a polyphenylene polymer. The solution, when applied to a gap fill structure with submicron gaps and cured, is found to completely fill the gaps.

EXAMPLE 5

Preparation of Polymer from 3,3'-(oxydi-1,4-phenylene)bis(2,4,5-triphenylcyclopentadienone) (Compound K), 4,4'-Bis(phenylethynyl) diphenyl ether (Compound H), and 1,3,5-Tris(phenylethynyl) benzene (Compound G)

To a 100-mL 3-necked round bottom flask is added 3,3'-(oxydi-1,4-phenylene)bis(2,4,5-triphenylcyclopentadienone)(10.0000 g, 0.01277 moles), 4,4'-bis(phenylethynyl)diphenyl ether (2.3660 g, 0.006386 moles), 1,3,5-tris(phenylethynyl)benzene (2.4170 g, 0.006386 moles), and N-methylpyrrolidinone (34.5 mL). The flask is attached to a nitrogen inlet and the magnetically stirred solution is heated to 200° C. in an oil bath. After 11 hours at 200° C. the solution is allowed to cool and is bottled. A portion of the solution is taken up in a syringe and filtered through a 1.0 micron syringe filter onto a 4 inch silicon wafer. The wafer is spin-coated at 2000 rpm for 60 seconds. The coated wafer is then placed on a hot plate set to 90° C. for two minutes. The wafer is then placed in a nitrogen purged oven where it is cured by purging at room temperature for 45 minutes then heated to 400° C. at 10° C./minutes, held at 400° C. for 1 hour, then allowed to cool to room temperature. The resultant wafer is thus coated with a polyphenylene polymer. The solution, when applied to a gap fill structure with submicron gaps, and cured is found to completely fill the gaps. The cured polymer is insoluble in N-methylpyrrolidinone.

EXAMPLE 6

Preparation of Polymer from 3,3'-(oxydi-1,4-phenylene)bis(2,4,5-triphenylcyclopentadienone) (Compound K), 1,3-Bis(phenylethynyl)benzene (Compound O) and 1,3,5-Tris(phenylethynyl) benzene (Compound G)

To a 25-mL Schlenk tube is added 3,3'-(oxydi-1,4-phenylene)bis(2,4,5-triphenylcyclopentadienone) (2.0000 g, 0.002554 moles), 1,3-bis(phenylethynyl) benzene (0.4740 g, 0.001703 moles), 1,3,5-tris(phenylethynyl)benzene (0.4834 g, 0.001277 moles), and N-methylpyrrolidinone (6.9 mL). The tube is attached to a nitrogen inlet and the magnetically stirred solution is heated to 200° C. in an oil bath. After 20 hours at 200° C., gel permeation chromatography indicates a $M_n$=1463 and a $M_w$=2660 relative to a polystyrene standard. The solution is allowed to cool to room temperature and is bottled. A portion of the solution is taken up in a syringe and filtered through a 1.0 micron syringe filter onto a 4" silicon wafer. The wafer is spin-coated at 2000 rpm for 60 seconds under a heat lamp which warms the wafer. The coated wafer is then placed on a hot plate set to 90° C. for two minutes. The wafer is then placed in a nitrogen purged oven where it is cured by purging at room temperature for 45 minutes, then heated to 400° C. at 10° C./minutes held at 400° C. for 1 hour, then allowed to cool to room temperature. The resultant wafer is thus coated with a polyphenylene polymer.

EXCAMPLE 7

Preparation of Oligomer Solution from 3,3'-(oxydi-1,4-phenylene)bis(2,4,5-triphenylcyclopentadienone) (Compound K) and 1,3,5-Tris(phenylethynyl) benzene (Compound G)

To a Pyrex® 1-L 3-necked round bottom flask which has been rinsed with deionized water and HPLC grade acetone and dried is added low ionic 3,3'-(oxydi-1,4-phenylene)bis (2,4,5-triphenylcyclopentadienone) (100.0 g, 0.128 moles), low ionic 1,3,5-tris(phenylethynyl)benzene (48.3 g, 0.128 moles), and electronic grade N-methylpyrrolidinone (346 g).

The flask is attached to a nitrogen/vacuum inlet. The magnetically stirred solution is degassed by applying vacuum and refilling with nitrogen five times. Nitrogen gas is then allowed to flow through the headspace of the flask and exit through a mineral oil bubbler. The solution is then heated to an internal temperature of 200° C. After 8.5 hours of heating the solution is allowed to cool and is transferred into a bottle made of tetrafluorethylene. Analysis of the final solution by gel permeation chromatography indicates a $M_n$=1498 and a $M_w$=2746 relative to a polystyrene standard. Analysis of the final solution by reverse phase chromatography indicates a residual 3,3'-(oxydi-1,4-phenylene)bis(2,4,5-triphenylcyclopentadienone) level of 1.8 weight percent. Analysis of the final solution by neutron activation indicates a sodium level of 52 ppb, a potassium level of 190 ppb, a palladium level of 90 ppb, a bromine level of 2.4 ppm, an iodine level of 0.6 ppm, and a chlorine level of 2.4 ppm.

EXAMPLE 8

Coating and Curing of Oligomer Solution from Example 7

A silane based adhesion promoter, AP8000 available from The Dow Chemical Company, is first applied, 3 mL for a 200 mm wafer, to the surface of a wafer; spun slowly to spread across the entire surface; allowed to stand for 2 seconds; and finally spun dry at 3000 rpm for 10 seconds. The polyphenylene oligomer solution prepared in Example 7 is applied, 4 mL for a 200 mm wafer, by a high precision pump/filtration system, Millipore Gen-2, onto the wafer surface coated with adhesion promoter as the wafer is spun at 750 rpm. The wafer rotation is accelerated to 2000 rpm immediately following the application of the oligomer solution and held at that spin speed for 20 seconds. A continuous stream of mesitylene is applied to the backside of the wafer for 5 seconds during the application of the oligomer solution. After spin coating the wafer with the oligomer solution, the film is dried on a hot plate at 70° C. for 20 seconds. After the dry bake step, the 2 mm to 5 mm edge bead of the coating is removed with a continuous stream of mesitylene while the wafer is spun at 2000 rpm either by application from the backside or directly from the top near the edge. After the edge bead removal, the oligomer is further polymerized on a hot plate at 325° C. for 90 seconds under a nitrogen blanket. The film is then crosslinked either on a hot plate at 450° C. for 2 minutes under nitrogen or in a nitrogen purged oven at 450° C. for 6 minutes. The film has a glass transition temperature greater than 450° C. as measured by Dynamic Mechanical Analysis.

TABLE I

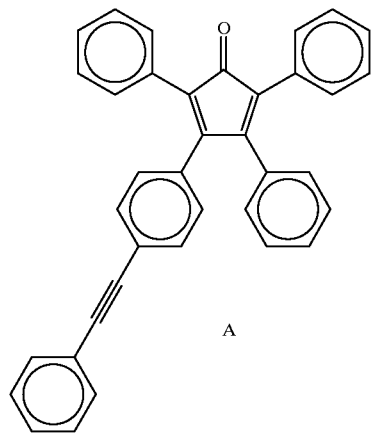

A

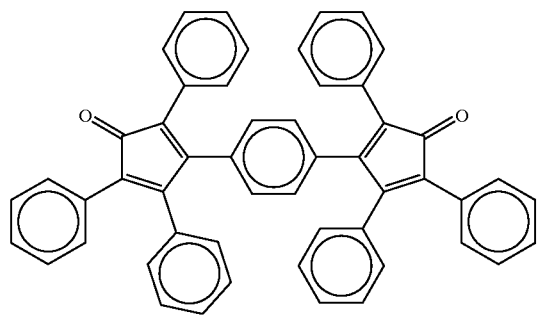

B

TABLE I-continued
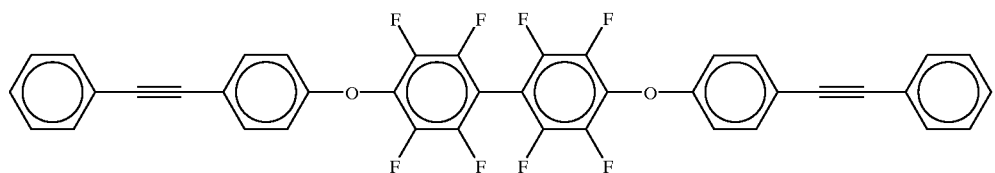
C
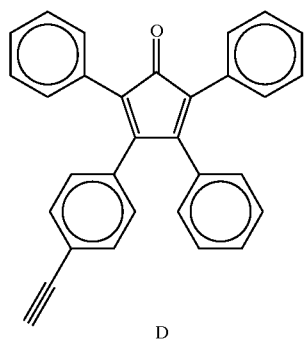
D
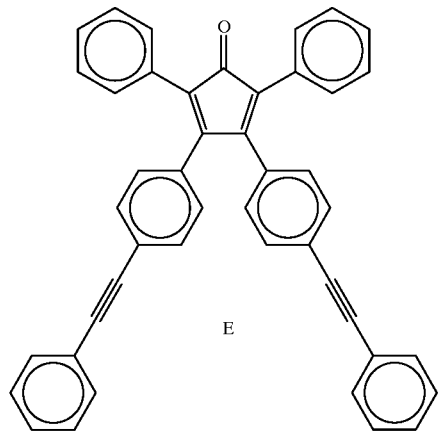
E
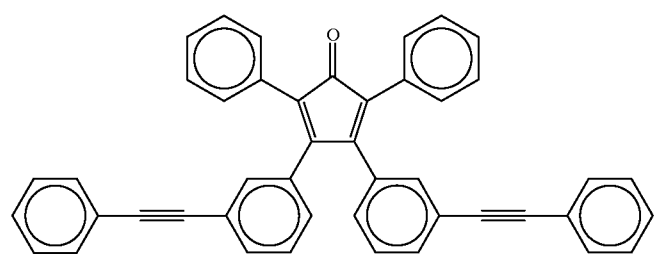
F

TABLE I-continued
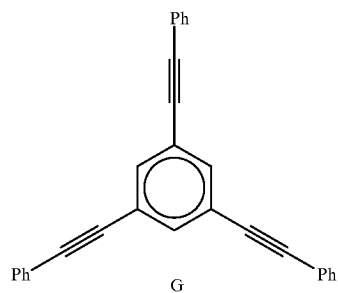
G
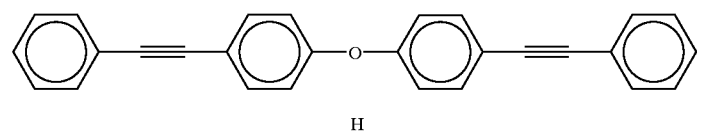
H
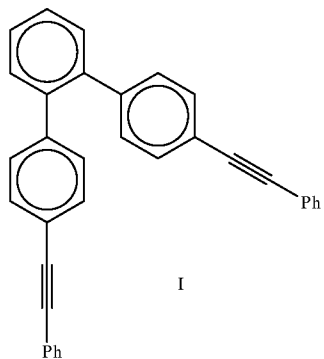
I
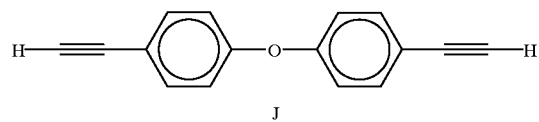
J
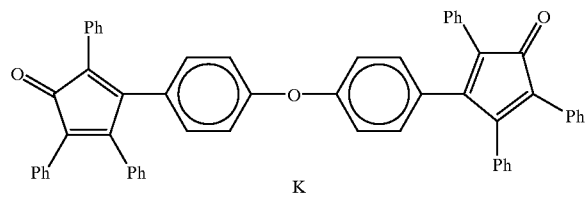
K
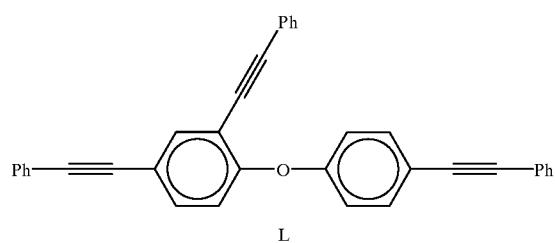
L TABLE I-continued
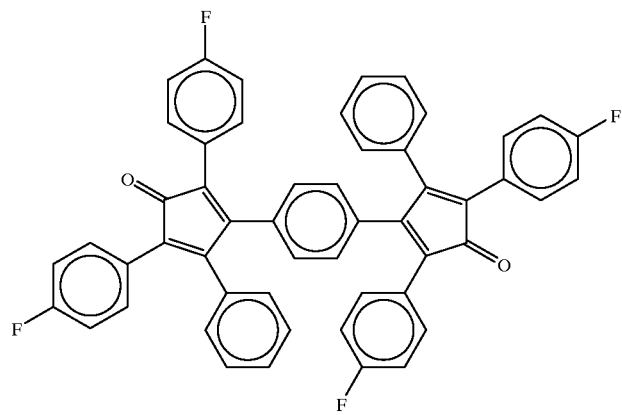
M
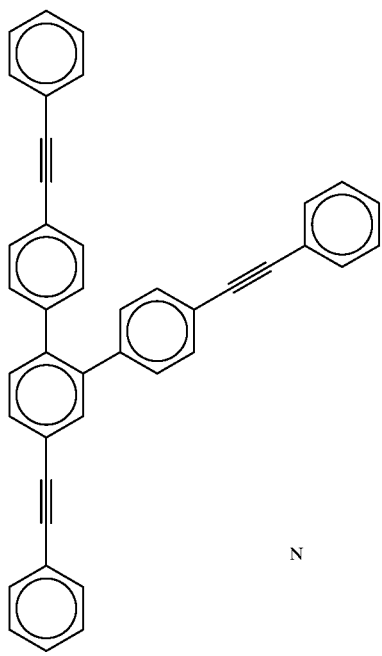
N
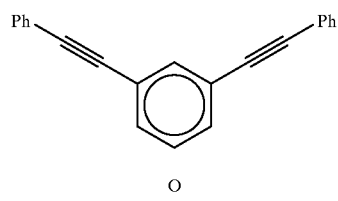
O TABLE I-continued

P

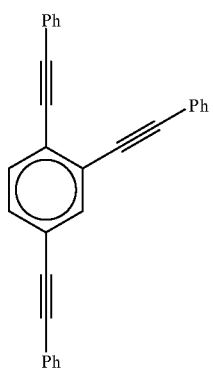

Q

Since the compound preparation procedures described above employ standard chemistry practices and it is known that slightly different reactants can require slightly different reaction parameters from those for other reactants, it is to be understood that minor modifications to the reaction parameters set forth such as the use of an excess of one reactant, the use of a catalyst, the use of temperatures slightly higher or lower than room temperature, for example, and/or high speed mixing and other such conventional changes are within the scope of the present invention.

What is claimed is:

1. An oligomer, uncured polymer, or cured polymer having the formula:

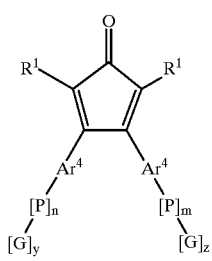

wherein P has the repeat structure:

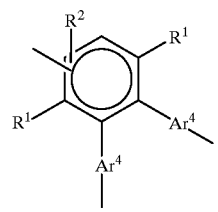

and wherein G has the structure:

wherein $R^1$ and $R^2$ are independently H or unsubstituted or inertly substituted aromatic moieties, $Ar^4$ is an aromatic moiety or an inertly substituted aromatic moiety, y and z are integers greater than or equal to 1 with the proviso that y+z is greater than or equal to 3, n and m are integers greater than or equal to 0 with the proviso that n+m is greater than or equal to 1.

2. An oligomer, uncured polymer or cured polymer composition comprising compounds having the formula:

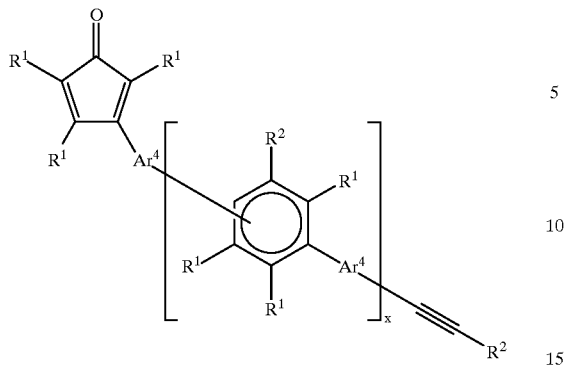

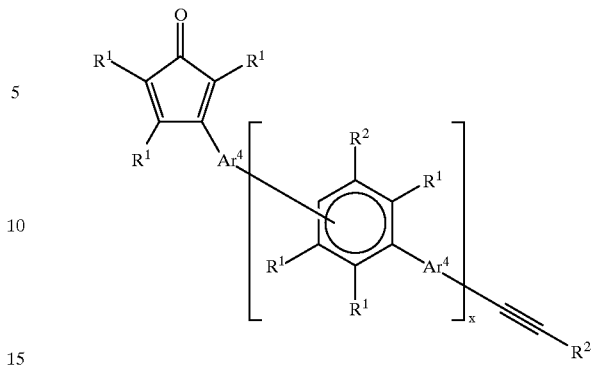

wherein Ar$^4$ is an aromatic moiety or an inertly-substituted aromatic moiety, R$^1$ and R$^2$ are independently H or an unsubstituted or inertly-substituted aromatic moiety and x is an integer from 1 to about 50, wherein the composition is free of compounds having two or more cyclopentadienone groups and compounds having two or more acetylene groups.

3. An oligomer, uncured polymer or cured polymer composition consisting of compounds having the same formula:

wherein Ar$^4$ is an aromatic moiety or an inertly-substituted aromatic moiety, R$^1$ and R$^2$ are independently H or an unsubstituted or inertly-substituted aromatic moiety and x is an integer from 1 to about 50 and, optionally, one or more materials selected from the group consisting of organic solvent, adhesion promoter, reinforcing fibers or mats, fillers, pigments, lubricating polymers, and conductive particles.

* * * * *